US011214241B2

(12) United States Patent
Kinoshita

(10) Patent No.: US 11,214,241 B2
(45) Date of Patent: Jan. 4, 2022

(54) VEHICLE POWER SUPPLY APPARATUS

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 313 days.

(21) Appl. No.: 16/401,814

(22) Filed: May 2, 2019

(65) Prior Publication Data

US 2019/0389449 A1 Dec. 26, 2019

(30) Foreign Application Priority Data

Jun. 25, 2018 (JP) .............................. JP2018-119429

(51) Int. Cl.
*B60W 20/00* (2016.01)
*B60K 6/26* (2007.10)
*B60W 10/06* (2006.01)
*B60W 10/08* (2006.01)

(52) U.S. Cl.
CPC .............. *B60W 20/00* (2013.01); *B60K 6/26* (2013.01); *B60W 10/06* (2013.01); *B60W 10/08* (2013.01); *B60W 2710/06* (2013.01); *B60W 2710/08* (2013.01); *B60Y 2200/92* (2013.01); *B60Y 2300/192* (2013.01)

(58) Field of Classification Search
CPC ...... B60W 20/00; B60W 10/06; B60W 10/08; B60W 2710/06; B60W 2710/08; B60W 20/13; B60W 2510/242; B60W 2510/305; B60K 6/26; B60K 6/28; B60K 6/48; B60K 6/485; B60Y 2300/192; B60Y 2200/92; Y02T 10/40; Y02T 10/62; F02N 2200/062; F02N 11/087; F02N 2200/043; F02N 11/0866; F02N 11/0825; F02N 11/04

See application file for complete search history.

(56) References Cited

U.S. PATENT DOCUMENTS

2015/0300308 A1  10/2015  Mori et al.
2016/0288651 A1* 10/2016  Kinoshita ............... B60L 58/20

FOREIGN PATENT DOCUMENTS

JP  2013-189944 A   9/2013
JP  2016-193634 A   11/2016
JP  2017-114303 A   6/2017

* cited by examiner

Primary Examiner — Brian P Sweeney
(74) Attorney, Agent, or Firm — McDermott Will & Emery LLP

(57) ABSTRACT

A vehicle power supply apparatus includes first and second power supply systems, first and second switches, first and second switch controllers, a generator motor controller, an engine controller, and an idling stop determination unit. The idling stop determination unit determines whether or not to inhibit an idling stop control on the basis of a current of an first electrical energy accumulator of the first power supply system, a current of a second electrical energy accumulator of the second power supply system, or a voltage of a generator motor of the second power supply system, or any combination thereof, while recognizing a third control signal to be transmitted to the generator motor, a first control signal to be transmitted to the first switch, and a second control signal to be transmitted to the second switch.

10 Claims, 22 Drawing Sheets

[SWITCH MALFUNCTIONING DETERMINATION PROCESSING
IN FAIL-SAFE CONTROL, PART 4]

[SW1: INSTRUCTION TO TURN OFF, SW2: INSTRUCTION TO TURN OFF,
AND ISG: INSTRUCTION TO GENERATE POWER]
[SW1: NORMAL]

[SWITCH MALFUNCTIONING DETERMINATION PROCESSING
IN FAIL-SAFE CONTROL, PART 4]

[SW1: INSTRUCTION TO TURN OFF, SW2: INSTRUCTION TO TURN OFF,
AND ISG: INSTRUCTION TO GENERATE POWER]
[SW1: STUCK ON]

[SWITCH MALFUNCTIONING DETERMINATION PROCESSING IN FAIL-SAFE CONTROL, PARTS 6 AND 7]

[SW1: INSTRUCTION TO TURN OFF, SW2: INSTRUCTION TO TURN OFF, AND ISG: INSTRUCTION TO POWER]
[SW1: NORMAL]

[SWITCH MALFUNCTIONING DETERMINATION PROCESSING IN FAIL-SAFE CONTROL, PARTS 6 AND 7]

[SW1: INSTRUCTION TO TURN OFF, SW2: INSTRUCTION TO TURN OFF, AND ISG: INSTRUCTION TO POWER]
[SW1: STUCK ON]

VEHICLE POWER SUPPLY APPARATUS

CROSS-REFERENCE TO RELATED APPLICATIONS

This application claims priority from Japanese Patent Application No. 2018-119429 filed on Jun. 25, 2018, the entire contents of which are hereby incorporated by reference.

BACKGROUND

The technology relates to a vehicle power supply apparatus to be mounted on a vehicle.

A vehicle power supply apparatus to be mounted on a vehicle includes not only an accumulator such as a lead battery and a lithium ion battery but also a generator motor such as a motor generator and an integrated starter generator (ISG). For example, reference can be made to Japanese Unexamined Patent Application Publication (JP-A) Nos. 2013-189944, 2016-193634, and 2017-114303. Moreover, such a vehicle power supply apparatus is provided with a switch in order to control a coupling state of the accumulator and the generator motor. The switch includes, for example, semiconductor. The switch of the vehicle power supply apparatus is controlled to an ON state and an OFF state in accordance with an operation state of the generator motor.

SUMMARY

An aspect of the technology provides a vehicle power supply apparatus to be mounted on a vehicle that includes an engine. The vehicle power supply apparatus includes a first power supply system, a second power supply system, a first switch, a second switch, a first switch controller, a second switch controller, a generator motor controller, an engine controller, and an idling stop determination unit. The first power supply system includes a first electrical energy accumulator and an electric load coupled to the first electrical energy accumulator. The second power supply system includes a generator motor and a second electrical energy accumulator. The generator motor is coupled to the engine, and the second electrical energy accumulator is able to be coupled to the generator motor. The first switch is configured to be controlled to a first turn-on state and a first turn-off state. The first turn-on state includes coupling the first power supply system and the second power supply system to each other, and the first turn-off state includes isolating the first power supply system and the second power supply system from each other. The second switch is configured to be controlled to a second turn-on state and a second turn-off state. The second turn-on state includes coupling the generator motor and the second electrical energy accumulator to each other, and the second turn-off state includes isolating the generator motor and the second electrical energy accumulator from each other. The first switch controller is configured to transmit a first control signal to the first switch and to control the first switch to the first turn-on state and the first turn-off state. The second switch controller is configured to transmit a second control signal to the second switch and to control the second switch to the second turn-on state and the second turn-off state. The generator motor controller is configured to transmit a third control signal to the generator motor and to control an operation state of the generator motor. The engine controller is configured to execute an idling stop control. The idling stop control includes stopping the engine on the basis of a stop condition and restarting the engine on the basis of a start condition with use of the generator motor. The idling stop determination unit is configured to determine whether or not to inhibit the idling stop control on the basis of a current of the first electrical energy accumulator, a current of the second electrical energy accumulator, or a voltage of the generator motor, or any combination thereof, while recognizing the third control signal to be transmitted to the generator motor, the first control signal to be transmitted to the first switch, and the second control signal to be transmitted to the second switch.

An aspect of the technology provides a vehicle power supply apparatus to be mounted on a vehicle that includes an engine. The vehicle power supply apparatus includes a first power supply system, a second power supply system, a first switch, a second switch, and circuitry. The first power supply system includes a first electrical energy accumulator and an electric load coupled to the first electrical energy accumulator. The second power supply system includes a generator motor and a second electrical energy accumulator. The generator motor is coupled to the engine, and the second electrical energy accumulator is able to be coupled to the generator motor. The first switch is configured to be controlled to a first turn-on state and a first turn-off state. The first turn-on state includes coupling the first power supply system and the second power supply system to each other, and the first turn-off state includes isolating the first power supply system and the second power supply system from each other. The second switch is configured to be controlled to a second turn-on state and a second turn-off state. The second turn-on state includes coupling the generator motor and the second electrical energy accumulator to each other, and the second turn-off state includes isolating the generator motor and the second electrical energy accumulator from each other. The circuitry is configured to transmit a first control signal to the first switch and to control the first switch to the first turn-on state and the first turn-off state. The circuitry is configured to transmit a second control signal to the second switch and to control the second switch to the second turn-on state and the second turn-off state. The circuitry is configured to transmit a third control signal to the generator motor and to control an operation state of the generator motor. The circuitry is configured to execute an idling stop control. The idling stop control includes stopping the engine on the basis of a stop condition and restarting the engine on the basis of a start condition with use of the generator motor. The circuitry is configured to determine whether or not to inhibit the idling stop control on the basis of a current of the first electrical energy accumulator, a current of the second electrical energy accumulator, or a voltage of the generator motor, or any combination thereof, while recognizing the third control signal to be transmitted to the generator motor, the first control signal to be transmitted to the first switch, and the second control signal to be transmitted to the second switch.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
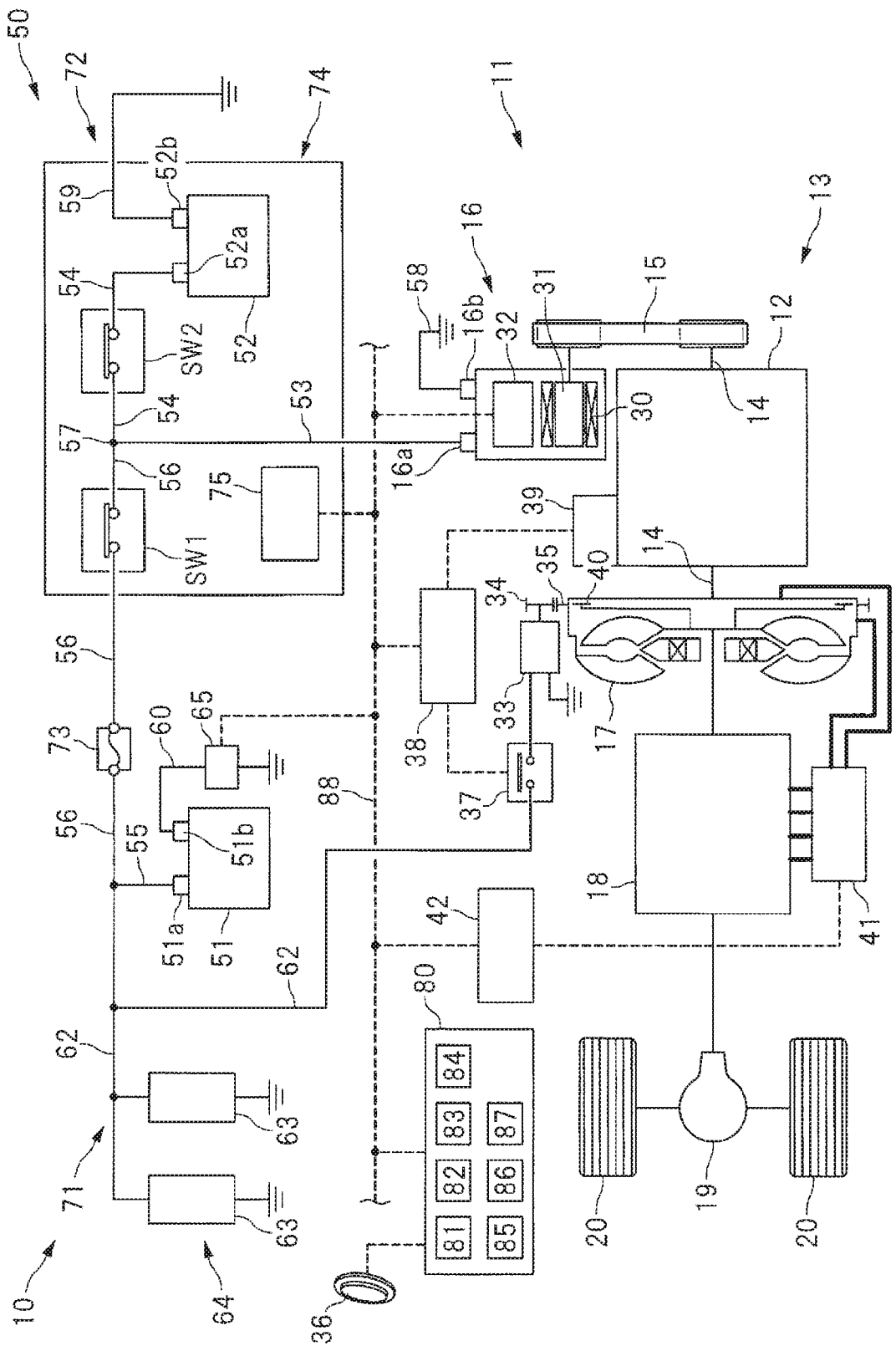
FIG. 1 is a schematic diagram of a configuration example of a vehicle on which a vehicle power supply apparatus according to one embodiment of the technology is mounted.

In the following, some preferred but non-limiting embodiments of the technology are described in detail with reference to the accompanying drawings. Note that sizes, materials, specific values, and any other factors illustrated in respective embodiments are illustrative for easier understanding of the technology, and are not intended to limit the scope of the technology unless otherwise specifically stated. Further, elements in the following example embodiments which are not recited in a most-generic independent claim of the technology are optional and may be provided on an as-needed basis. Throughout the present specification and the drawings, elements having substantially the same function and configuration are denoted with the same reference numerals to avoid any redundant description. Further, elements that are not directly related to the technology are unillustrated in the drawings. The drawings are schematic and are not intended to be drawn to scale.

In recent years, more and more vehicles have had an idling stop function. The idling stop function includes stopping an engine automatically on the basis of a predetermined stop condition, and restarting the engine on the basis of a predetermined start condition. In many cases, in restarting the engine on the basis of the predetermined start condition, the engine is brought to starting rotation with the use of a generator motor. Because such an engine restart is accompanied by a rapid increase in power consumption of the generator motor, there arises a request for an appropriate control of a switch inside a vehicle power supply apparatus from viewpoint of stabilization of a power supply voltage of the vehicle power supply apparatus. However, in a case where the switch becomes inoperable because of a malfunction, it is impracticable to control appropriately the switch inside the vehicle power supply apparatus, resulting in difficulties in the stabilization of the power supply voltage of the vehicle power supply apparatus. What is desired is, therefore, to inhibit an idling stop control in a case with possibility of a malfunctioning state of the switch.

It is desirable to provide a vehicle power supply apparatus that makes it possible to inhibit an idling stop control properly.

[Vehicle Configuration]

FIG. 1 schematically illustrates a configuration example of a vehicle 11 on which a vehicle power supply apparatus 10 according to one embodiment of the technology is mounted. Referring to FIG. 1, on the vehicle 11, a power unit 13 may be mounted. The power unit 13 may include an engine 12 that serves as a power source. The engine 12 may include a crank shaft 14 to which a starter generator 16 is coupled through a belt mechanism 15. A transmission mechanism 18 may be also coupled to the engine 12 through a torque converter 17. One or more wheels 20 may be coupled to the transmission mechanism 18 through, for example but not limited to, a differential mechanism 19.

In one embodiment of the technology, the starter generator 16 may serve as a "generator motor".

The starter generator 16 coupled to the engine 12 may be a so-called integrated starter generator (ISG) that serves as a generator and an electric motor. Not only may the starter generator 16 serve as the generator driven by the crank shaft 14, the starter generator 16 may also serve as the electric motor that drives the crank shaft 14. For example, the starter generator 16 may be controlled to a powering state, in a case of a restart of the engine 12 in an idling stop control, or in a case of assistance with the engine 12 at the time of, for example, a start and acceleration. Thus, the starter generator 16 may serve as the electric motor.

The starter generator 16 may include a stator 30 and a rotor 31. The stator 30 may include a stator coil. The rotor 31 may include a field coil. The starter generator 16 may further include an ISG controller 32, in order to control energized states of the stator coil and the field coil. The ISG controller 32 may include an inverter, a regulator, a microcomputer, various sensors, and other parts. Allowing the ISG controller 32 to control the energized states of the field coil and the stator coil causes a control of, for example but not limited to, a power generation voltage, power generation torque, and powering torque of the starter generator 16. It is to be noted that the ISG controller 32 may have a function of detecting a terminal voltage, or the power generation voltage, of the starter generator 16.

In one embodiment of the technology, the terminal voltage of the starter generator 16 may serve as a "voltage of a generator motor" and an "applied voltage to the generator motor".

The power unit 13 may include a starter motor 33 that brings the engine 12 to starting rotation. The starter motor 33 may include a pinion 34. The pinion 34 is able to move between a protruding position and a retreating position. At the protruding position, the pinion 34 is engaged with a ring gear 35 of the torque converter 17. At the retreating position, the engagement of the pinion 34 with the ring gear 35 is released. As described later, an occupant operates, e.g., presses down, a starter button 36, and thereupon, a starter relay 37 is switched to an ON state. The starter relay 37 may control energization of the starter motor 33. Thus, the starter motor 33 is energized through the starter relay 37, causing the pinion 34 of the starter motor 33 to move to the protruding position and to rotate. Moreover, the vehicle 11 may include an engine controller 38 in order to control the starter motor 33 through the starter relay 37. The engine controller 38 may include, for example but not limited to, a microcomputer. The engine controller 38 may control not only the starter relay 37 but also engine auxiliaries 39 such as a throttle valve, an injector, and an ignition device.

As mentioned above, the vehicle 11 illustrated in the figures may include the starter generator 16 and the starter motor 33, as the electric motor that brings the engine 12 to the starting rotation. The starting rotation of the engine 12 is performed with the use of the starter generator 16, in a case of the restart of the engine 12 by the idling stop control, i.e., in a case where the engine 12 is stopped because the stop condition is satisfied while the engine 12 is in operation, and the engine 12 is restarted because the start condition is satisfied while the engine 12 is stopped. Meanwhile, the starting rotation of the engine 12 is performed with the use of the starter motor 33, in a case where a control system of the vehicle 11 is started up to cause an initial start of the engine 12, i.e., in a case where the occupant operates the starter button 36 to start the engine 12.

The torque converter 17 may further include a lock up clutch 40. Controlling the lock up clutch 40 to an engaged state causes the engine 12 and the transmission mechanism 18 to be coupled through the lock up clutch 40. Meanwhile, controlling the lock up clutch 40 to a disengaged state causes the engine 12 and the transmission mechanism 18 to be coupled through the torque converter 17. Moreover, the lock up clutch 40 may be able to be controlled not only to the engaged state and the disengaged state, but also to a slip state. In order to switch an operation state of the lock up clutch 40, a valve unit 41 may be coupled to the torque converter 17, and a transmission controller 42 may be coupled to the valve unit 41. The valve unit 41 may include, for example but not limited to, a solenoid valve and an oil path. The transmission controller 42 may include, for example but not limited to, a microcomputer.

[Power Circuit]

Figure 2:
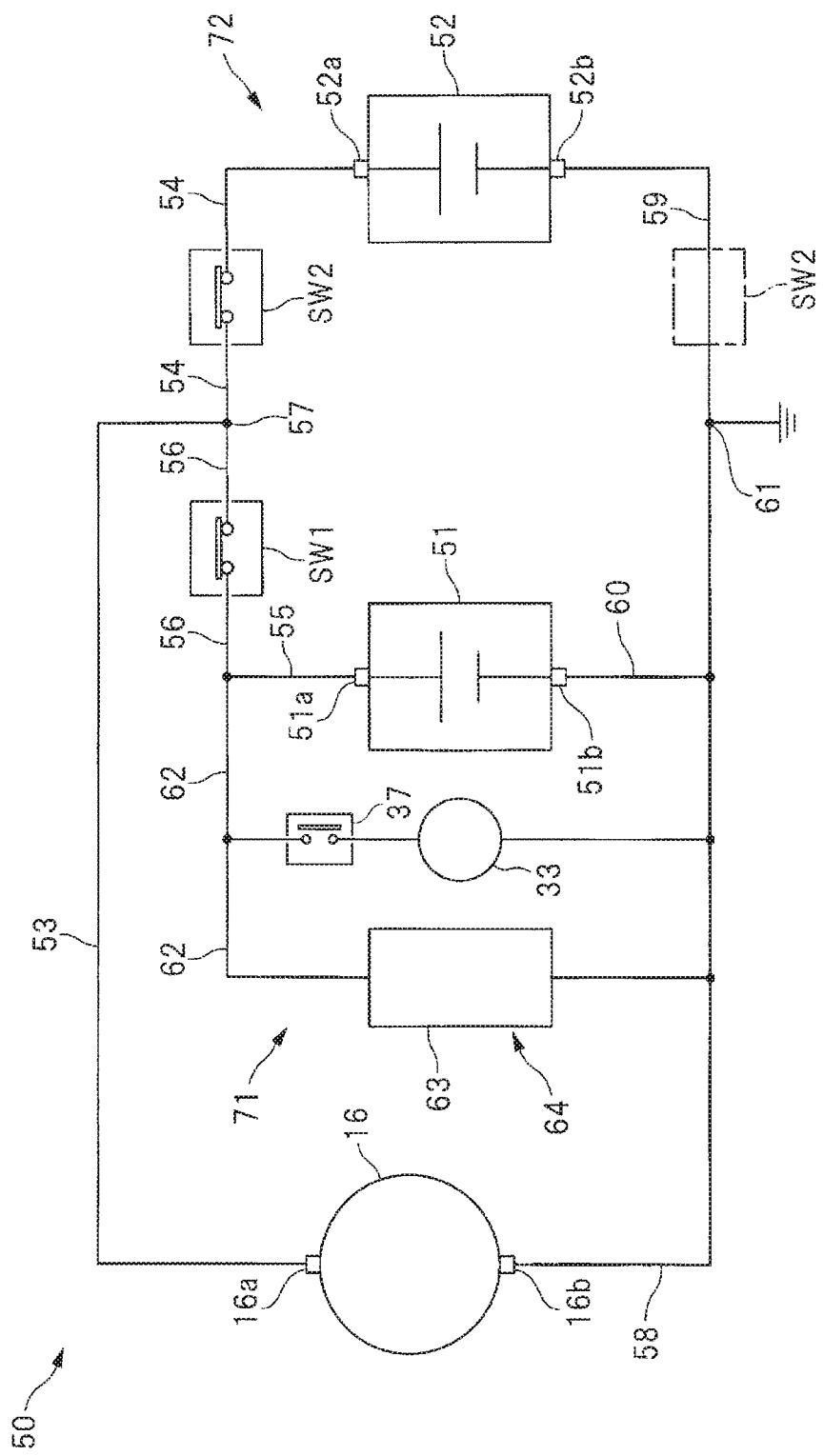
FIG. 2 is a circuit diagram of a simplified example of a power circuit.

The vehicle power supply apparatus 10 may include a power circuit 50, description of which is given below. FIG. 2 is a circuit diagram of a simplified example of the power circuit 50. Referring to FIG. 2, the power circuit 50 may include a lead battery 51 and a lithium ion battery 52. The lead battery 51 may be electrically coupled to the starter generator 16. The lithium ion battery 52 may be electrically coupled, in parallel with the lead battery 51, to the starter generator 16. It is to be noted that a terminal voltage of the lithium ion battery 52 may be higher in design than a terminal voltage of the lead battery 51, in order to positively cause discharge of the lithium ion battery 52. Moreover, internal resistance of the lithium ion battery 52 may be lower in design than internal resistance of the lead battery 51, in order to positively cause charge and the discharge of the lithium ion battery 52.

In one embodiment of the technology, the lead battery 51 may serve as a "first electrical energy accumulator". In one embodiment of the technology, the lithium ion battery 52 may serve as a "second electrical energy accumulator".

A positive electrode line 53 may be coupled to a positive electrode terminal 16a of the starter generator 16. A positive electrode line 54 may be coupled to a positive electrode terminal 52a of the lithium ion battery 52. A positive electrode line 56 may be coupled to a positive electrode terminal 51a of the lead battery 51 through a positive electrode line 55. The positive electrode lines 53, 54, and 56 may be coupled to one another through a connection point 57. Moreover, a negative electrode line 58 may be coupled to a negative electrode terminal 16b of the starter generator 16. A negative electrode line 59 may be coupled to a negative electrode terminal 52b of the lithium ion battery 52. A negative electrode line 60 may be coupled to a negative electrode terminal 51b of the lead battery 51. The negative electrode lines 58, 59, and 60 may be coupled to one another through a reference potential point 61.

As illustrated in FIG. 1, to the positive electrode line 55 of the lead battery 51, coupled may be a positive electrode line 62. To the positive electrode line 62, coupled may be a group of electric devices 64 including electric devices 63 such as various actuators and various controllers. Moreover, to the negative electrode line 60 of the lead battery 51, coupled may be a battery sensor 65. The battery sensor 65 may have a function of detecting a charge state and a discharge state of the lead battery 51. Non-limiting examples of the charge state and the discharge state of the lead battery 51 may include a charge current, a discharge current, the terminal voltage, and a state of charge SOC of the lead battery 51. It is to be noted that the state of charge SOC refers to a ratio of an amount of charged power to a designed capacity of a battery.

In one embodiment of the technology, the electric devices 63 may each serve as an "electric load".

The power circuit 50 includes a first power supply system 71 and a second power supply system 72. The first power supply system 71 includes the lead battery 51 and the electric devices 63. The second power supply system 72 includes the lithium ion battery 52 and the starter generator 16. The first power supply system 71 and the second power supply system 72 may be coupled to each other through the positive electrode line 56. On the positive electrode line 56, provided may be an electric power fuse 73 and a switch SW1. The electric power fuse 73 is configured to be melted down by an excessive current. The switch SW1 is configured to be controlled to an ON state and an OFF state. Moreover, on the positive electrode line 54 of the lithium ion battery 52, provided may be a switch SW2. The switch SW2 is configured to be controlled to an ON state and an OFF state.

In one embodiment of the technology, the switch SW1 may serve as a "first switch" and the switch SW2 may serve as a "second switch". In one embodiment of the technology, the ON state of the switch SW1 may serve as a "first turn-on state", and the OFF state of the switch SW1 may serve as a "first turn-off state". In one embodiment of the technology, the ON state of the switch SW2 may serve as a "second turn-on state", and the OFF state of the switch SW2 may serve as a "second turn-off state".

Controlling the switch SW1 to the ON state makes it possible to couple the first power supply system 71 and the second power supply system 72 to each other. Controlling the switch SW1 to the OFF state makes it possible to isolate the first power supply system 71 and the second power supply system 72 from each other. Moreover, controlling the switch SW2 to the ON state makes it possible to couple the starter generator 16 and the lithium ion battery 52 to each other. Controlling the switch SW2 to the OFF state makes it possible to isolate the starter generator 16 and the lithium ion battery 52 from each other.

The switches SW1 and SW2 may each be a switch including a semiconductor element such as a metal oxide semiconductor field effect transistor (MOSFET), or alternatively the switches SW1 and SW2 may each be a switch that causes a contact to mechanically open or close with the use of, for example but not limited to, electromagnetic force. The ON state of the switches SW1 and SW2 refers to an energized state that forms electrical coupling, or a conductive state. The OFF state of the switches SW1 and SW2 refers to a non-energized state that forms electrical isolation, or a cutoff state. It is to be noted that the switches SW1 and SW2 may be also referred to as, for example, a relay or a contactor.

As illustrated in FIG. 1, the power circuit 50 may include a battery module 74. The battery module 74 may include not only the lithium ion battery 52 but also the switches SW1 and SW2. The battery module 74 may further include a battery controller 75. The battery controller 75 may include, for example but not limited to, a microcomputer and various sensors. The battery controller 75 may have a function of monitoring, for example but not limited to, a state of charge SOC, a charge current, a discharge current, the terminal voltage, a cell temperature, and the internal resistance of the lithium ion battery 52. The battery controller 75 may also have a function of controlling the switches SW1 and SW2.

[Control System]

As illustrated in FIG. 1, the vehicle power supply apparatus 10 may include a main controller 80. The main controller 80 is provided for a cooperative control of, for example but not limited to, the power unit 13 and the power circuit 50. The main controller 80 may include, for example but not limited to, a microcomputer. The main controller 80 may include, for example but not limited to, an engine control unit 81, an ISG control unit 82, a first switch control unit 83, a second switch control unit 84, and an idling stop determination unit 85. The engine control unit 81 may control the engine 12. The ISG control unit 82 may control the starter generator 16. The first switch control unit 83 may control the switch SW1. The second switch control unit 84 may control the switch SW2. The idling stop determination unit 85 may determine whether or not to inhibit the idling stop control. The main controller 80 may further include, for example but not limited to, a starter control unit 86 and a lock up clutch control unit 87. The starter control unit 86 may control the starter motor 33. The lock up clutch control unit 87 may control the lock up clutch 40.

In one embodiment of the technology, the ISG control unit 82 may serve as a "generator motor controller".

The main controller 80, the ISG controller 32, the engine controller 38, the transmission controller 42, and the battery controller 75 may be communicatively coupled to one another through an on-vehicle network 88 such as a controller area network (CAN) and a local interconnect network (LIN). The main controller 80 may control the power unit 13, the power circuit 50, and other parts on the basis of information from the controllers and the sensors. It is to be noted that the main controller 80 may control the starter generator 16 through the ISG controller 32, and control the switches SW1 and SW2 through the battery controller 75. Moreover, the main controller 80 may control the engine 12 and the starter motor 33 through the engine controller 38, and control the lock up clutch 40 through the transmission controller 42.

[Power Generation Control of Starter Generator]

Description is given next of a power generation control of the starter generator 16. The power generation control may be made by the main controller 80. The ISG control unit 82 of the main controller 80 may supply a control signal to the ISG controller 32, to control the starter generator 16 to a power generation state or the powering state. The power generation state of the starter generator 16 may include a combustion power generation state and a regenerative power generation state described later. For example, in a case where the state of charge SOC of the lithium ion battery 52 lowers, the ISG control unit 82 may raise the power generation voltage of the starter generator 16, to control the starter generator 16 to the combustion power generation state. In a case where the state of charge SOC of the lithium ion battery 52 increases, the ISG control unit 82 may lower the power generation voltage of the starter generator 16, to control the starter generator 16 to a power generation suspended state. It is to be noted that in FIG. 3 and subsequent figures which are described below, the starter generator 16 is abbreviated to "ISG".

Figure 3:
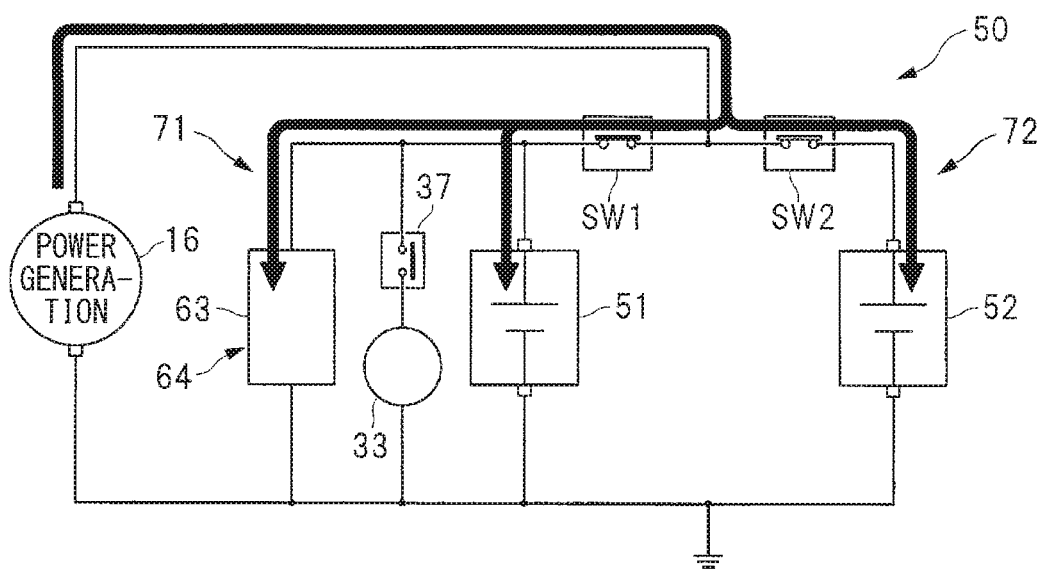
FIG. 3 is a diagram of an example of a situation as to how currents are supplied, with a starter generator controlled to a combustion power generation state.

FIG. 3 illustrates an example of a situation as to how currents are supplied, with the starter generator 16 controlled to the combustion power generation state. In one specific but non-limiting example, in a case where the state of charge SOC of the lithium ion battery 52 is lower than a predetermined lower limit, the starter generator 16 may be driven, by engine power, for power generation, in order to charge the lithium ion battery 52 and to increase the state of charge SOC. Thus, in controlling the starter generator 16 to the combustion power generation state, the power generation voltage of the starter generator 16 may be raised to a greater value than the terminal voltages of the lead battery 51 and the lithium ion battery 52. In this way, as denoted by black arrows in FIG. 3, currents may be supplied from the starter generator 16 to, for example, the lithium ion battery 52, the group of the electric devices 64, and the lead battery 51, causing the lithium ion battery 52 and the lead battery 51 to be charged slowly. It is to be noted that the combustion power generation state of the starter generator 16 means allowing, by the engine power, the starter generator 16 to generate power, i.e., causing fuel combustion inside the engine 12 to allow the starter generator 16 to generate power.

Figure 4:
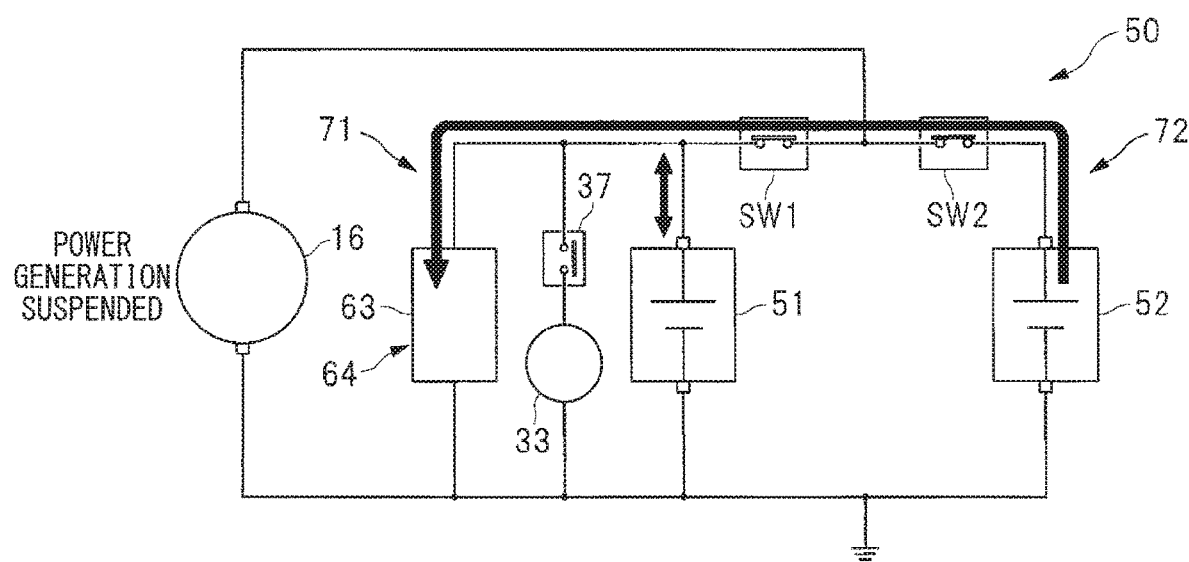
FIG. 4 is a diagram of an example of a situation as to how currents are supplied, with the starter generator controlled to a power generation suspended state.

FIG. 4 illustrates an example of a situation as to how currents are supplied, with the starter generator 16 controlled to the power generation suspended state. In one specific but non-limiting example, in a case where the state of charge SOC of the lithium ion battery 52 is higher than a predetermined upper limit, driving the starter generator 16, by the engine power, for the power generation may be stopped, in order to positively cause the discharge of the lithium ion battery 52. Thus, in controlling the starter generator 16 to the power generation suspended state, the power generation voltage of the starter generator 16 may be lowered to a smaller value than the terminal voltages of the lead battery 51 and the lithium ion battery 52. In this way, as denoted by black arrows in FIG. 4, a current may be supplied from the lithium ion battery 52 to the group of the electric devices 64. This makes it possible to suppress or stop the driving of the starter generator 16 for the power generation, leading to reduction in an engine load. It is to be noted that it suffices for the power generation voltage of the starter generator 16 in the power generation suspended state to be a power generation voltage that allows the lithium ion battery 52 to discharge. For example, the power generation voltage of the starter generator 16 may be controlled to 0 (zero) V, or alternatively, the power generation voltage of the starter generator 16 may be controlled to a greater value than 0 (zero) V.

As mentioned above, the ISG control unit 82 of the main controller 80 may control the starter generator 16 to the combustion power generation state or the power generation suspended state on the basis of the state of charge SOC. Meanwhile, at the time of vehicle deceleration, it is desirable to recover much kinetic energy to enhance fuel consumption performance. Therefore, at the time of the vehicle deceleration, the power generation voltage of the starter generator 16 may be raised considerably, to control the starter generator 16 to the regenerative power generation state. This makes it possible to increase power-generated electric power of the starter generator 16. It is therefore possible to positively convert the kinetic energy to electric energy and to recover the electric energy, leading to higher energy efficiency of the vehicle 11 and enhancement in the fuel consumption performance. A determination as to whether or not to execute regenerative power generation as described above may be made on the basis of, for example but not limited to, operation states of an accelerator pedal and a brake pedal. For example, on decelerated travel with a release of stepping down of the accelerator pedal, or on decelerated travel with stepping down of the brake pedal, the starter generator 16 may be controlled to the regenerative power generation state.

Figure 5:
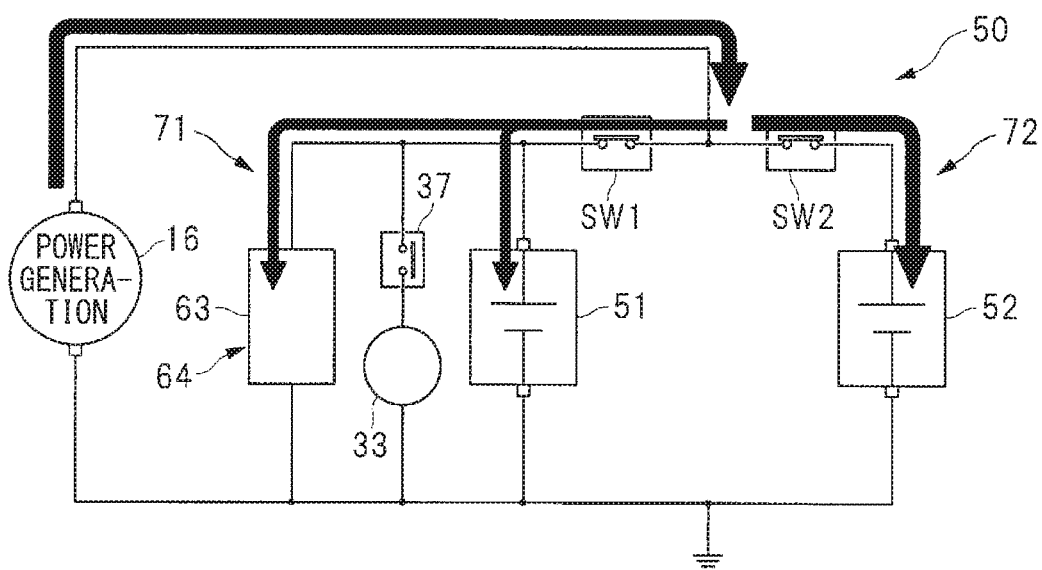
FIG. 5 is a diagram of an example of a situation as to how currents are supplied, with the starter generator controlled to a regenerative power generation state.

FIG. 5 illustrates an example of a situation as to how currents are supplied, with the starter generator 16 controlled to the regenerative power generation state. In controlling the starter generator 16 to the regenerative power generation state, the power generation voltage of the starter generator 16 may be raised to a higher value than in the combustion power generation state as mentioned above. Thus, an applied voltage to the lithium ion battery 52 may be brought to a higher value than the terminal voltage. This causes large current supply from the starter generator 16 to the lithium ion battery 52 and the lead battery 51, as denoted by black arrows in FIG. 5, resulting in rapid charge of the lithium ion battery 52 and the lead battery 51. Moreover, because the internal resistance of the lithium ion battery 52 is smaller than the internal resistance of the lead battery 51, most of the power-generated current is supplied to the lithium ion battery 52.

It is to be noted that as illustrated in FIGS. 3 to 5, in controlling the starter generator 16 to the combustion power generation state, the regenerative power generation state, and the power generation suspended state, the switches SW1 and SW2 may be kept in the ON state. In other words, in the vehicle power supply apparatus 10, it is possible to control the charge and the discharge of the lithium ion battery 52 solely by controlling the power generation voltage of the starter generator 16 without making a switching control of the switches SW1 and SW2. Hence, it is possible to easily control the charge and the discharge of the lithium ion battery 52, and to enhance durability of the switches SW1 and SW2.

[Engine Restart in Idling Stop Control]

The engine control unit 81 of the main controller 80 executes the idling stop control. The idling stop control includes automatically stopping and restarting the engine 12. The engine control unit 81 may execute, for example but not limited to, a fuel cut to stop the engine 12, in the case where the predetermined stop condition is satisfied while the engine 12 is in operation. The engine control unit 81 may bring the starter generator 16 to rotation to restart the engine 12, in the case where the predetermined start condition is satisfied while the engine 12 is stopped. Non-limiting examples of the stop condition of the engine 12 may include that a vehicle speed is lower than a predetermined value, with the brake pedal being stepped down. Non-limiting examples of the start condition of the engine 12 may include that the stepping down of the brake pedal is released, and that the stepping down of the accelerator pedal is started.

Figure 6:
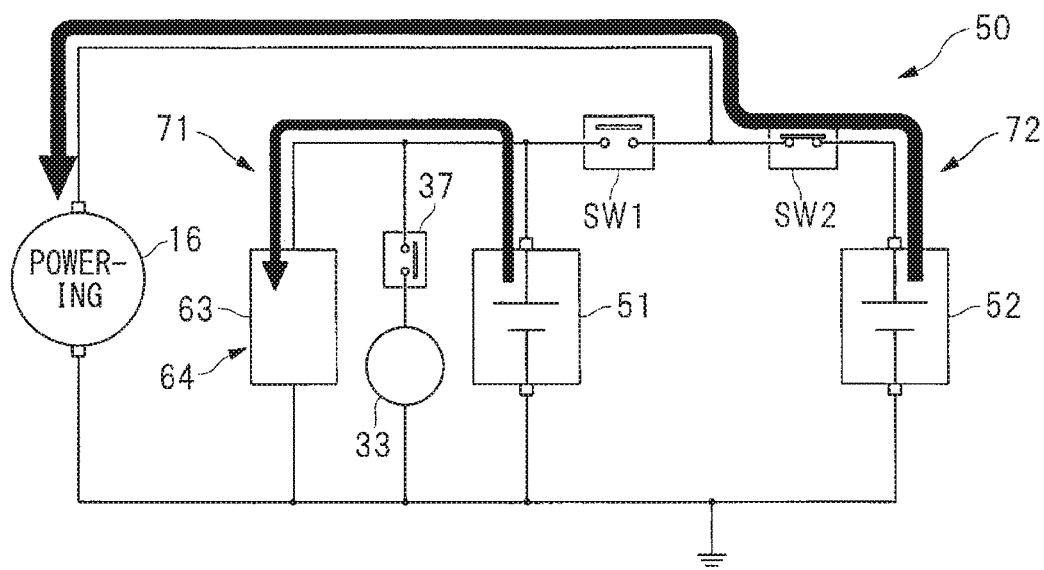
FIG. 6 is a diagram of an example of a situation as to how currents are supplied, with the starter generator controlled to a powering state.

The ISG control unit 82 of the main controller 80 may control the starter generator 16 to the powering state, to bring the engine 12 to the starting rotation, in a case where the start condition is satisfied while the engine 12 is stopped in the idling stop control. FIG. 6 illustrates an example of a situation as to how currents are supplied, with the starter generator 16 controlled to the powering state. As illustrated in FIG. 6, in controlling the starter generator 16 to the powering state at the restart of the engine 12 in the idling stop control, the switch SW1 may be switched from the ON state to the OFF state. In other words, in allowing the starter generator 16 to bring the engine 12 to the starting rotation, the switch SW1 may be switched to the OFF state, causing the isolation of the first power supply system 71 and the second power supply system 72 from each other. This makes it possible to prevent an instantaneous voltage drop with respect to the group of the electric devices 64 of the first power supply system 71 even in a case with large current supply from the lithium ion battery 52 to the starter generator 16. It is therefore possible to allow the group of the electric devices 64 to function normally.

[Motor Assistance Control]

Figure 7:
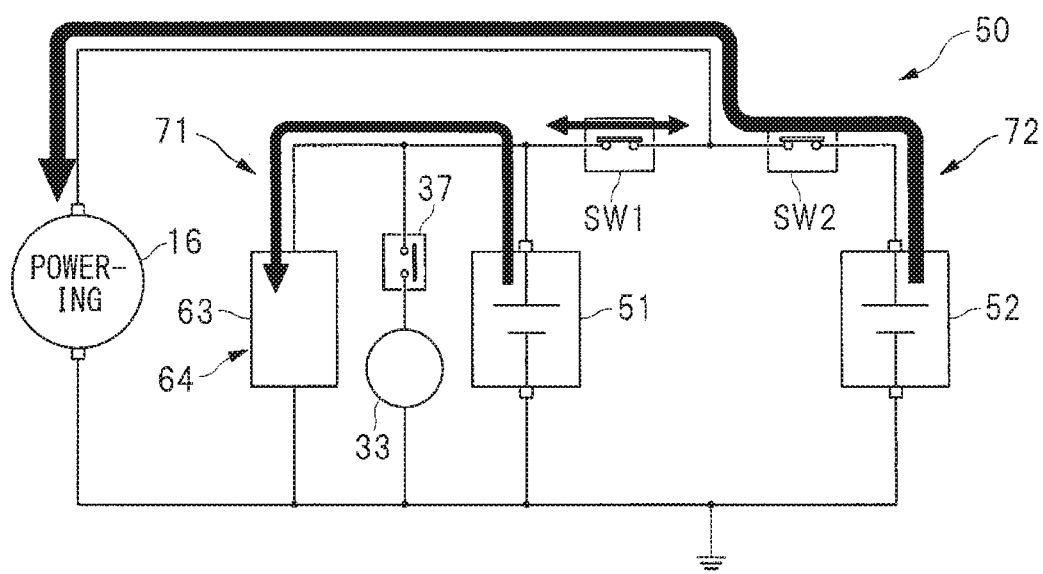
FIG. 7 is a diagram of an example of a situation as to how currents are supplied, with the starter generator controlled to the powering state.

The ISG control unit 82 of the main controller 80 may control the starter generator 16 to the powering state at the time of, for example, the start and the acceleration, to execute a motor assistance control. The motor assistance control includes allowing the starter generator 16 to provide assistance with the engine 12. FIG. 7 illustrates an example of a situation as to how currents are supplied, with the starter generator 16 controlled to the powering state. As illustrated in FIG. 7, in controlling the starter generator 16 to the powering state in accompaniment with the motor assistance control, the switches SW1 and SW2 may both be kept at the ON state. Thus, in the case where the starter generator 16 is allowed to provide assistance with the engine 12, controlling the switches SW1 and SW2 to the ON state causes both the lead battery 51 and the lithium ion battery 52 to be coupled to the group of the electric devices 64. This makes it possible to stabilize a power supply voltage of the group of the electric devices 64, leading to enhancement in reliability of the vehicle power supply apparatus 10.

As mentioned above, the switch SW1 may be switched to the OFF state at the restart of the engine 12 by the starter generator 16. Meanwhile, the switch SW1 may be kept at the ON state while the starter generator 16 provides motor assistance. In other words, the restart of the engine 12 means a situation that the starter generator 16 causes the engine 12 that is stopped to start rotation. Such a situation may easily involve an increase in power consumption of the starter generator 16. In contrast, the motor assistance means a situation that the starter generator 16 may supplementarily drive the engine 12 that is rotating. Such a situation may involve reduction in the power consumption of the starter generator 16. Because the power consumption of the starter generator 16 is reduced as mentioned above in the motor assistance control, keeping the switch SW1 at the ON state causes no large current supply from the lead battery 51 to the starter generator 16. It is therefore possible to stabilize the power supply voltage of the group of the electric devices 64.

[Engine Initial Start Control and Lead Battery Supplementary Charge Control]

Figure 8:
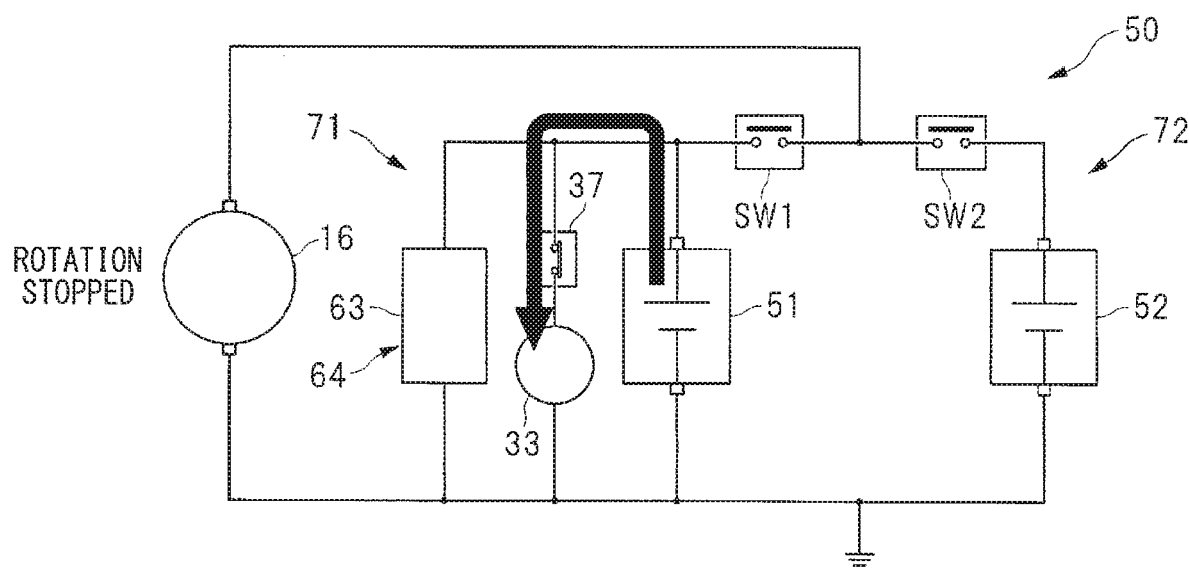
FIG. 8 is a diagram of an example of a situation as to how currents are supplied, in an engine initial start control.
Figure 9:
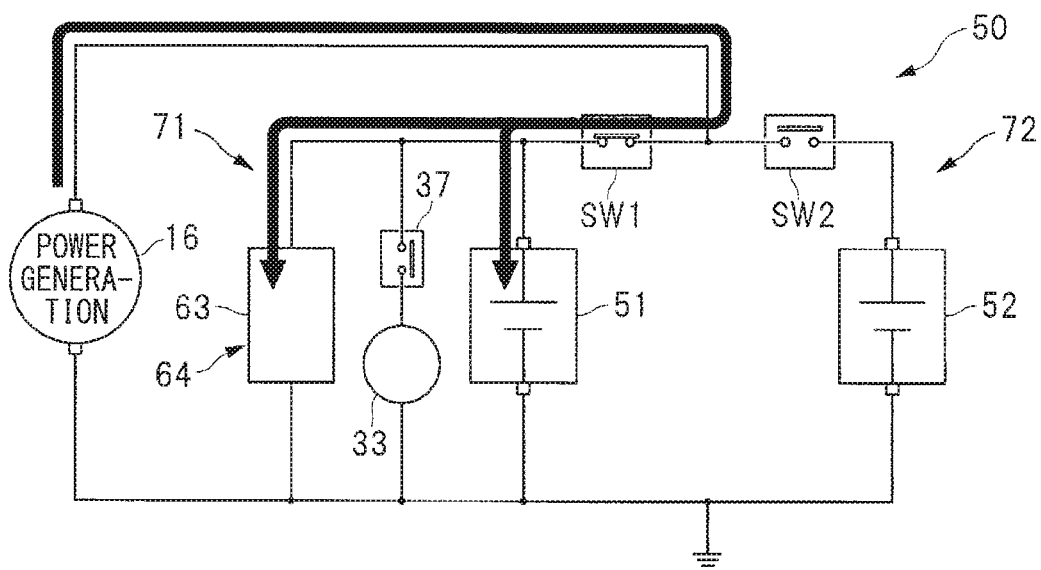
FIG. 9 is a diagram of an example of a situation as to how currents are supplied, in a lead battery supplementary charge control.

Described next is an engine initial start control that includes starting the engine 12 with the use of the starter motor 33, following which described is a lead battery supplementary charge control to be executed by the starter generator 16 after an initial start of the engine 12. FIG. 8 illustrates an example of a situation as to how currents are supplied, in the engine initial start control. FIG. 9 illustrates an example of a situation as to how currents are supplied, in the lead battery supplementary charge control.

In a case where the control system of the vehicle 11 is started up, to cause the initial start of the engine 12, i.e., in a case where the operation of the starter button 36 starts the engine 12, the starter motor 33 may bring the engine 12 to the starting rotation. In the engine initial start control, as illustrated in FIG. 8, the switch SW1 may be controlled to the OFF state. The switch SW2 may be controlled to the OFF state. The starter relay 37 may be controlled to an ON state. Thus, currents are supplied from the lead battery 51 to the starter motor 33, bringing the starter motor 33 to rotation, to start the engine 12.

Thus, the engine 12 is started by the starter motor 33, and thereupon, as illustrated in FIG. 9, the starter relay 37 may be switched to an OFF state. The switch SW1 may be switched to the ON state. The starter generator 16 may be controlled to the combustion power generation state. In other words, at the start of the engine 12, while the switch SW2 is kept at the OFF state, the switch SW1 may be switched to the ON state, and the starter generator 16 may be controlled to the combustion power generation state. This makes it possible to allow the starter generator 16 to positively charge the lead battery 51, leading to restoration of the state of charge SOC of the lead battery 51 that tends to lower during a stop of the vehicle 11 or at the initial start of the engine 12.

Specifically, during the stop of the vehicle 11, a dark current flows from the lead battery 51 to the group of the electric devices 64. At the initial start of the engine 12, a large current flows from the lead battery 51 to the starter motor 33. Accordingly, the state of charge SOC of the lead battery 51 decreases gradually during the stop of the vehicle 11 and at the initial start of the engine 12. Executing the lead battery supplementary charge control after the initial start of the engine 12 causes the restoration of the lowered state of charge SOC of the lead battery 51. It is to be noted that the lead battery supplementary charge control may be continued for predetermined time, or alternatively, the lead battery supplementary charge control may be continued until the state of charge SOC of the lead battery 51 is restored to a predetermined value.

[Fail-Safe Control and Switch Malfunctioning Determination Processing]

In the following, described is a fail-safe control to be executed by the vehicle power supply apparatus 10. As mentioned above, the switch SW1 may be controlled to the ON state and the OFF state in accordance with the operation state of the vehicle power supply apparatus 10. However, in a case of a malfunctioning state where the switch SW1 is in the ON state and becomes inoperable, i.e., the switch SW1 is stuck ON, it is difficult to allow the vehicle power supply apparatus 10 to operate properly in accordance with the idling stop control.

As mentioned above, at the restart of the engine 12 in the idling stop control, the starter generator 16 may be controlled to the powering state. In this case, as illustrated in FIG. 6, the switch SW1 may be switched to the OFF state, causing the isolation of the first power supply system 71 and the second power supply system 72 from each other. This makes it possible to prevent the instantaneous voltage drop with respect to the group of the electric devices 64 of the first power supply system 71 even in a case with a rapid increase in the power consumption of the starter generator 16. It is therefore possible to allow the group of the electric devices 64, without limitation, to function normally.

In the case where the switch SW1 has been stuck ON, however, it is impracticable to isolate the first power supply system 71 and the second power supply system 72 from each other, causing difficulties in maintaining the power supply voltage of the group of the electric devices 64 at the restart of the engine 12 by the starter generator 16. Thus, the vehicle power supply apparatus 10 according to this embodiment of the technology executes any one of parts 1 to 7 of the following fail-safe control, to inhibit the idling stop control in a case with possibility that the switch SW1 is stuck ON.

As described later, in the fail-safe control, parts 1 to 7, the idling stop determination unit 85 of the main controller 80 determines whether or not to inhibit the idling stop control on the basis of a current of the lead battery 51, a current of the lithium ion battery 52, or a voltage of the starter generator 16, or any combination thereof, while recognizing a control signal to be transmitted to the starter generator 16, a control signal to be transmitted to the switch SW1, and a control signal to be transmitted to the switch SW2.

In one embodiment of the technology, the control signal to be transmitted to the switch SW1 may serve as a "first control signal". In one embodiment of the technology, the control signal to be transmitted to the switch SW2 may serve as a "second control signal". In one embodiment of the technology, the control signal to be transmitted to the starter generator 16 may serve as a "third control signal".

It is to be noted that the ISG control unit 82 of the main controller 80 transmits the control signal to the starter generator 16 through the ISG controller 32. Specific but non-limiting examples of the control signal to be transmitted to the starter generator 16 may include a power generation signal, a power generation suspension signal, and a powering signal. The power generation signal may control the starter generator 16 to the combustion power generation state or the regenerative power generation state. The power generation suspension signal may control the starter generator 16 to the power generation suspended state. The powering signal may control the starter generator 16 to the powering state.

The first switch control unit 83 of the main controller 80 transmits the control signal to the switch SW1 through the battery controller 75. Specific but non-limiting examples of the control signal to be transmitted to the switch SW1 may include an ON signal that controls the switch SW1 to the ON state, and an OFF signal that controls the switch SW1 to the OFF state. The second switch control unit 84 of the main controller 80 transmits the control signal to the switch SW2 through the battery controller 75. Specific but non-limiting examples of the control signal to be transmitted to the switch SW2 may include an ON signal that controls the switch SW2 to the ON state, and an OFF signal that controls the switch SW2 to the OFF state.

In one embodiment of the technology, the ON signal that controls the first switch SW1 to the ON state may serve as a "first turn-on signal", and the OFF signal that controls the first switch SW1 to the OFF state may serve as a "first turn-off signal". In one embodiment of the technology, the ON signal that controls the second switch SW2 to the ON state may serve as a "second turn-on signal", and the OFF signal that controls the second switch SW2 to the OFF state may serve as a "second turn-off signal".

(Fail-Safe Control, Part 1)

Figure 10:
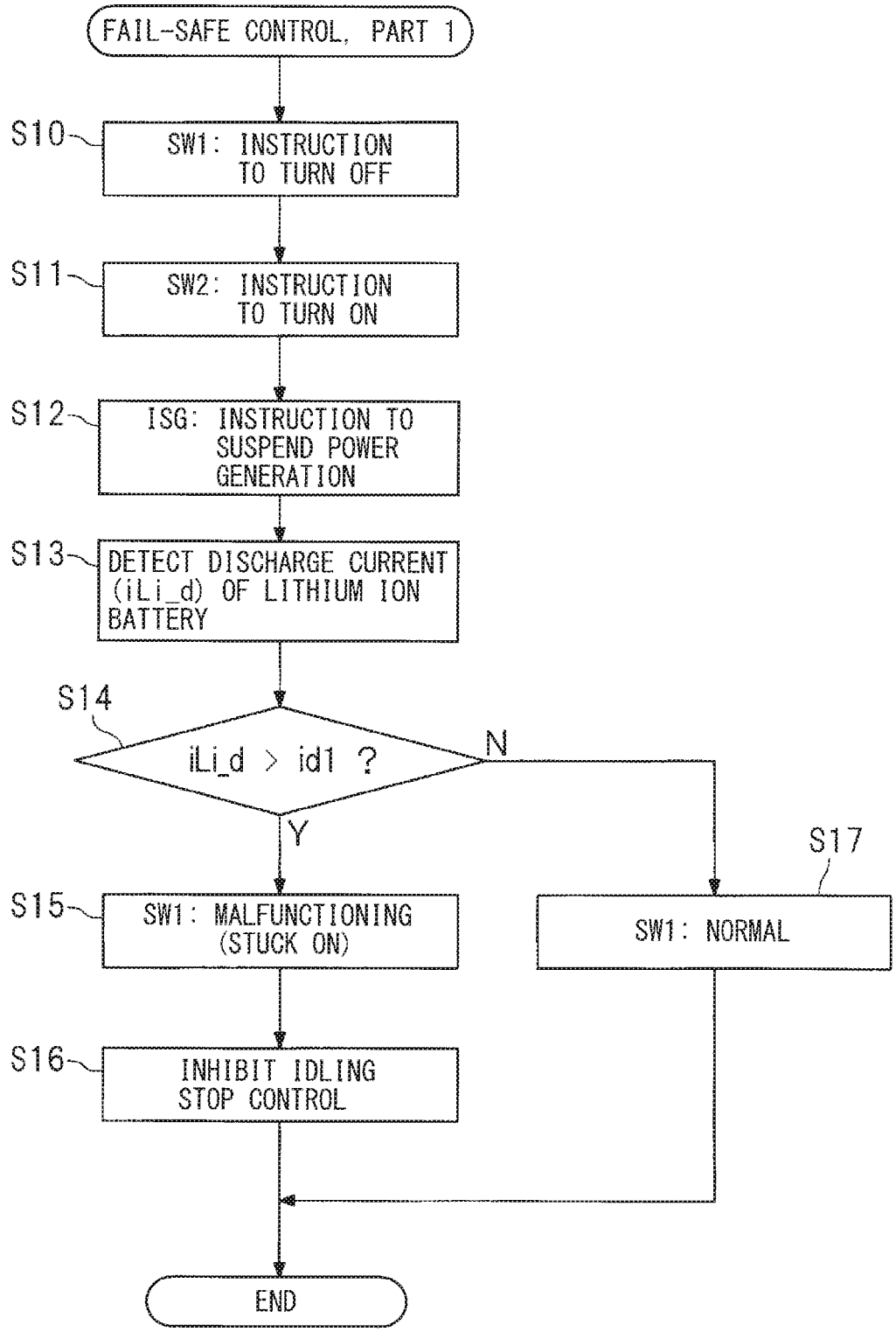
FIG. 10 is a flowchart of an example of an execution procedure in a fail-safe control, part 1.
Figure 11A:
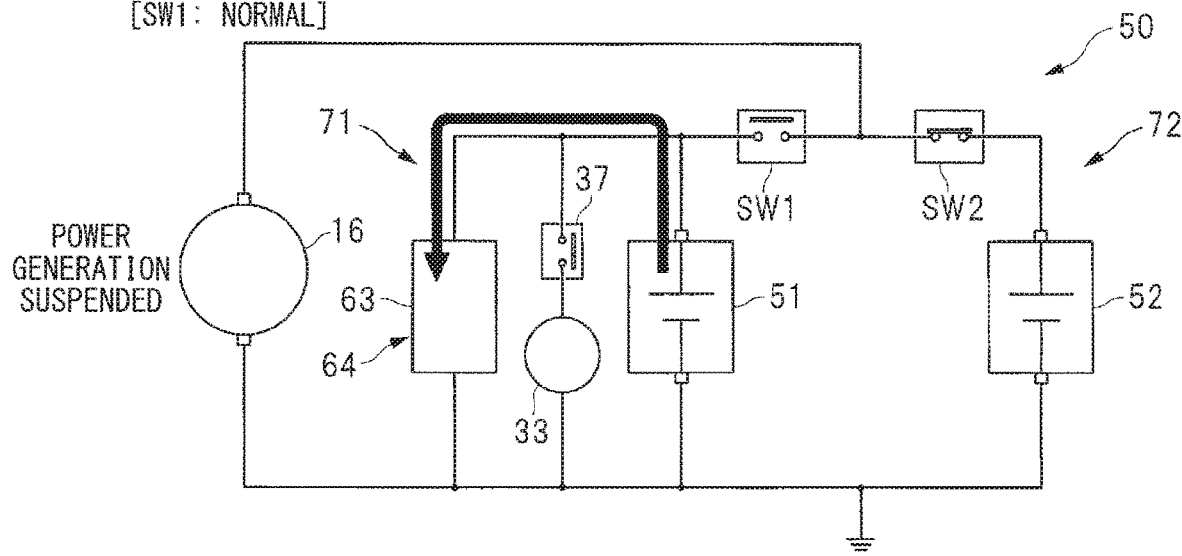
FIGS. 11A and 11B are diagrams of examples of situations as to how currents are supplied, in executing a switch malfunctioning determination processing in the fail-safe control, part 1.
Figure 11B:
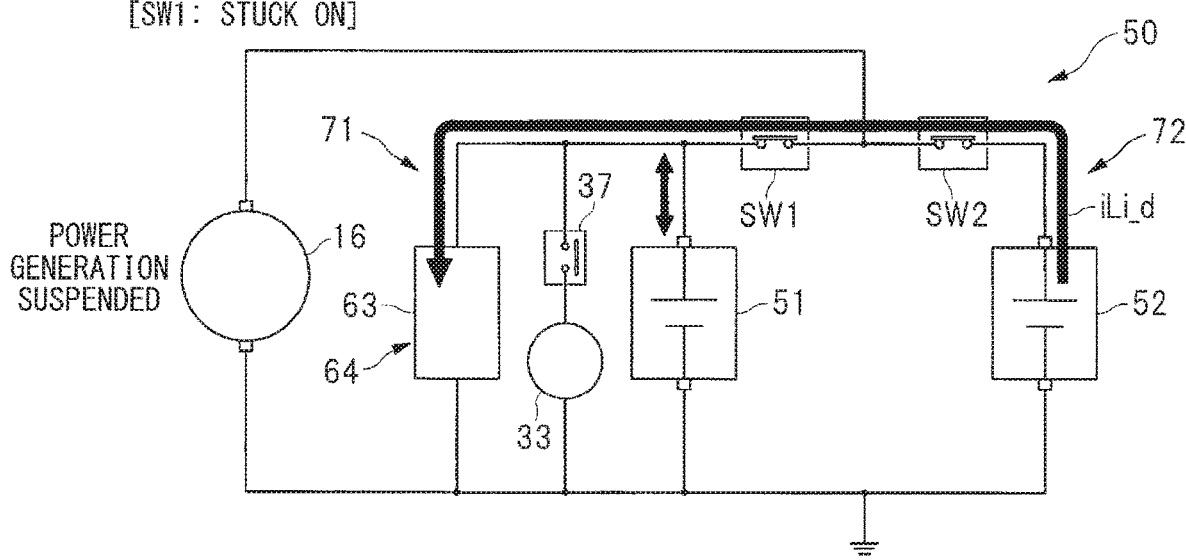

FIG. 10 is a flowchart of an example of an execution procedure in the fail-safe control, part 1. FIGS. 11A and 11B are diagrams of examples of situations as to how currents are supplied, in executing a switch malfunctioning determination processing in the fail-safe control, part 1. FIG. 11A illustrates the situation in a case where the switch SW1 is normal. FIG. 11B illustrates the situation in a case where the switch SW1 is stuck ON. It is to be noted that black arrows in FIGS. 11A and 11B indicate how the currents are supplied.

Referring to FIG. 10, in step S10, the OFF signal may be transmitted to the switch SW1. In step S11, the ON signal may be transmitted to the switch SW2. In step S12, the power generation suspension signal may be transmitted to the starter generator 16. Thereafter, in step S13, a discharge current iLi_d to be discharged from the lithium ion battery 52 may be detected. It is to be noted that the discharge current iLi_d may be detected by the battery controller 75.

In one embodiment of the technology, the discharge current iLi_d may serve as a "current of the second electrical energy accumulator".

Thereafter, in step S14, a determination may be made as to whether or not the discharge current iLi_d of the lithium ion battery 52 is greater than a predetermined threshold id1. In step S14, in a case where a determination is made that the discharge current iLi_d is greater than the threshold id1 (Y in step S14), the flow may proceed to step S15. In step S15, a determination may be made that the switch SW1 is stuck ON. In the case where the determination is made that the switch SW1 is stuck ON, the flow may proceed to step S16. In step S16, the idling stop control accompanied by the restart of the engine 12 may be inhibited. Meanwhile, in step S14, in a case where a determination is made that the discharge current iLi_d is equal to or smaller than the threshold id1 (N in step S14), the flow may proceed to step S17. In step S17, a determination may be made that the switch SW1 is normal.

In one embodiment of the technology, the threshold id1 may serve as a "first threshold".

As illustrated in FIG. 11A, in the case where the switch SW1 is normal, the switch SW1 is controlled to the OFF state. The switch SW2 is controlled to the ON state. The starter generator 16 is controlled to the power generation suspended state. In this case, solely the starter generator 16 in the power generation suspended state is coupled to the lithium ion battery 52. Accordingly, the discharge current iLi_d of the lithium ion battery 52 is 0 (zero) A.

In contrast, as illustrated in FIG. 11B, in the case where the switch SW1 is stuck ON, the switch SW1 is kept at the ON state. The switch SW2 is controlled to the ON state. The starter generator 16 is controlled to the power generation suspended state. In this case, the group of the electric devices 64 is coupled to the lithium ion battery 52. Accordingly, the discharge current iLi_d of the lithium ion battery 52 has a current value that substantially corresponds to current consumption of the group of the electric devices 64.

In other words, in the case where the switch SW1 is stuck ON, the discharge current iLi_d of the lithium ion battery 52 becomes larger than in the case where the switch SW1 is normal. Accordingly, comparing the discharge current iLi_d with the threshold id1 to determine their magnitude relation and grasping how the discharge current iLi_d is increasing makes it possible to detect that the switch SW1 is stuck ON. It is to be noted that the threshold id1 may be set on the basis of, for example but not limited to, experiments and simulation so as to grasp how the discharge current iLi_d is increasing.

In the case where the determination is made that the switch SW1 is stuck ON because the discharge current iLi_d is greater than the threshold id1, the idling stop control is inhibited. As described, in the case where the switch SW1 is stuck ON, it is impracticable to isolate the first power supply system 71 and the second power supply system 72 from each other, causing difficulties in maintaining the power supply voltage of the group of the electric devices 64 at the restart of the engine 12 by the starter generator 16.

Thus, in the case where the determination is made that the switch SW1 is stuck ON, the idling stop control is inhibited as fail-safe operation, to avoid the restart of the engine 12 by the starter generator 16. It is to be noted that in a case where the determination is made that the switch SW1 is stuck ON while the engine 12 is stopped by the idling stop control, the idling stop control may be inhibited after the start of the engine 12.

As described, the idling stop control may be inhibited in the case where the discharge current iLi_d of the lithium ion battery 52 is greater than the threshold id1, with the power generation suspension signal transmitted to the starter generator 16, with the OFF signal transmitted to the switch SW1, and with the ON signal transmitted to the switch SW2. Hence, it is possible to inhibit the idling stop control properly in the case with the possibility that the switch SW1 is stuck ON.

(Fail-Safe Control, Part 2)

Figure 12:
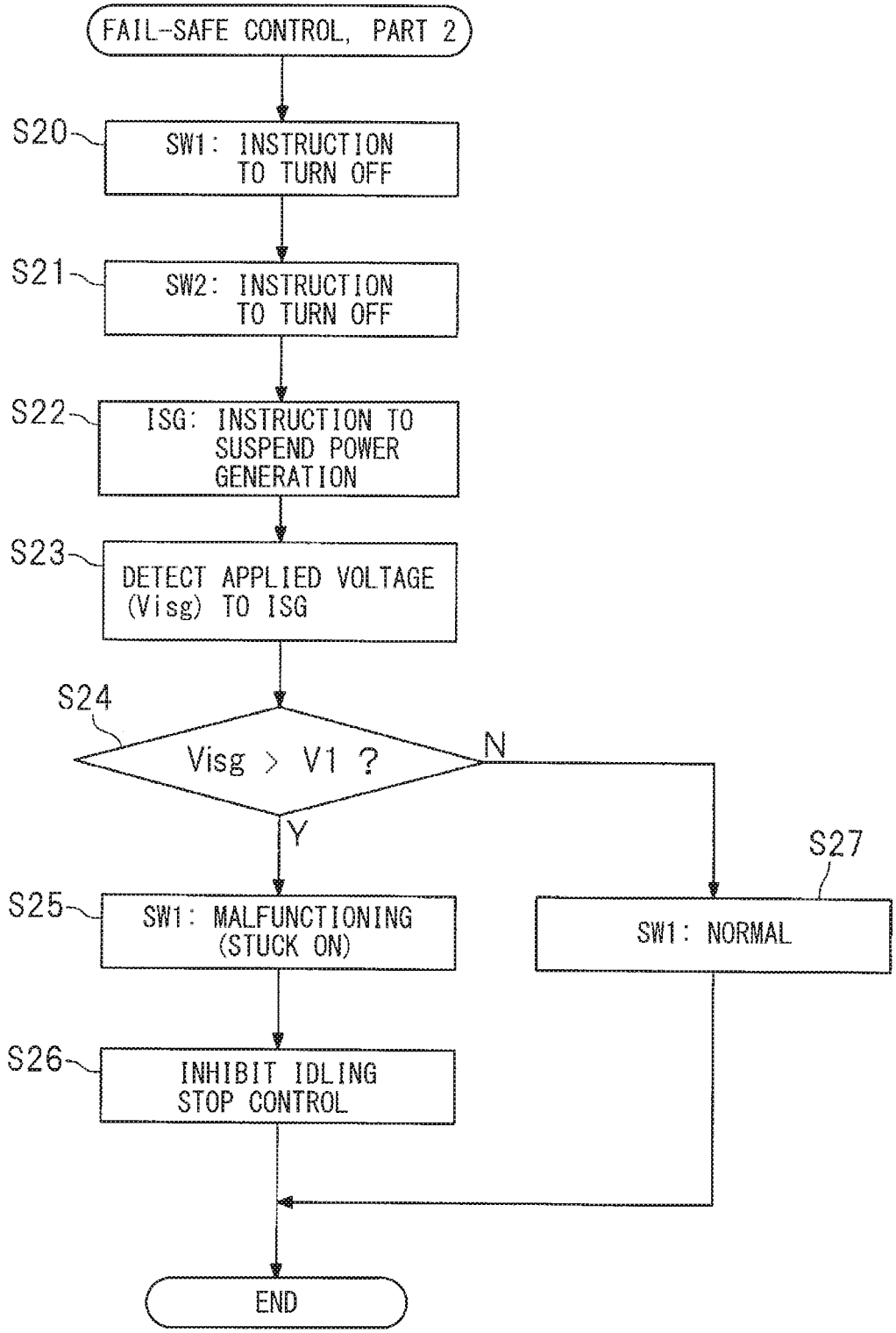
FIG. 12 is a flowchart of an example of an execution procedure in a fail-safe control, part 2.
Figure 13A:
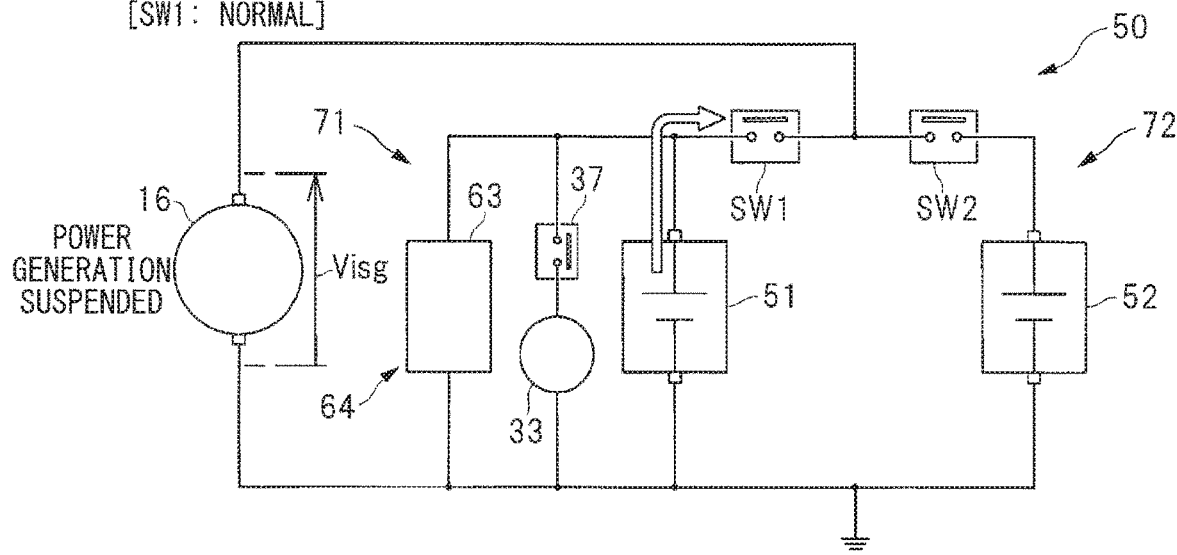
FIGS. 13A and 13B are diagrams of examples of situations as to how voltages are applied, in executing a switch malfunctioning determination processing in the fail-safe control, part 2.
Figure 13B:
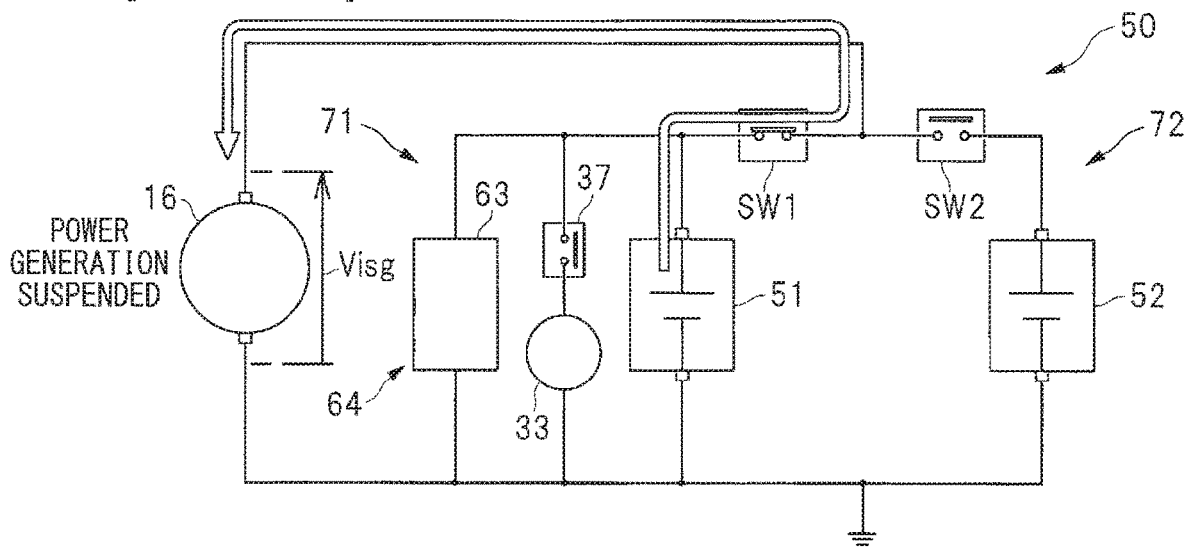

FIG. 12 is a flowchart of an example of an execution procedure in the fail-safe control, part 2. FIGS. 13A and 13B are diagrams of examples of situations as to how voltages are applied, in executing a switch malfunctioning determination processing in the fail-safe control, part 2. FIG. 13A illustrates the situation in the case where the switch SW1 is normal. FIG. 13B illustrates the situation in the case where the switch SW1 is stuck ON. It is to be noted that white outlined arrows in FIGS. 13A and 13B indicate how the voltages are applied by the lead battery 51.

Referring to FIG. 12, in step S20, the OFF signal may be transmitted to the switch SW1. In step S21, the OFF signal may be transmitted to the switch SW2. In step S22, the power generation suspension signal may be transmitted to the starter generator 16. Thereafter, in step S23, a terminal voltage Visg to be applied to the starter generator 16 may be detected. It is to be noted that the terminal voltage Visg to be applied to the starter generator 16, i.e., an applied voltage Visg to the starter generator 16, may be detected by the ISG controller 32.

In one embodiment of the technology, the terminal voltage Visg may serve as an "applied voltage to the generator motor" and a "voltage of the generator motor".

Thereafter, in step S24, a determination may be made as to whether or not the applied voltage Visg to the starter generator 16 is greater than a predetermined threshold V1. In step S24, in a case where a determination is made that the applied voltage Visg is greater than the threshold V1 (Y in step S24), the flow may proceed to step S25. In step S25, a determination may be made that the switch SW1 is stuck ON. In the case where the determination is made that the switch SW1 is stuck ON, the flow may proceed to step S26. In step S26, the idling stop control accompanied by the restart of the engine 12 may be inhibited. Meanwhile, in step S24, in a case where a determination is made that the applied voltage Visg is equal to or smaller than the threshold V1 (N in step S24), the flow may proceed to step S27. In step S27, a determination may be made that the switch SW1 is normal.

In one embodiment of the technology, the threshold V1 may serve as a "second threshold".

As illustrated in FIG. 13A, in the case where the switch SW1 is normal, the switch SW1 is controlled to the OFF state. The switch SW2 is controlled to the OFF state. The starter generator 16 is controlled to the power generation suspended state. In this case, both the lead battery 51 and the lithium ion battery 52 are isolated from the starter generator 16. Accordingly, the applied voltage Visg to the starter generator 16 is 0 (zero) V.

In contrast, as illustrated in FIG. 13B, in the case where the switch SW1 is stuck ON, the switch SW1 is kept at the ON state. The switch SW2 is controlled to the OFF state. The starter generator 16 is controlled to the power generation suspended state. In this case, the lead battery 51 is coupled to the starter generator 16. Accordingly, the applied voltage Visg to the starter generator 16 has a voltage value that corresponds to the terminal voltage of the lead battery 51.

In other words, in the case where the switch SW1 is stuck ON, the applied voltage Visg to the starter generator 16 becomes larger than in the case where the switch SW1 is normal. Accordingly, comparing the applied voltage Visg with the threshold V1 to determine their magnitude relation and grasping how the applied voltage Visg is increasing makes it possible to detect that the switch SW1 is stuck ON. It is to be noted that the threshold V1 may be set on the basis of, for example but not limited to, experiments and simulation so as to grasp how the applied voltage Visg is increasing.

In the case where the determination is made that the switch SW1 is stuck ON because the applied voltage Visg is greater than the threshold V1, the idling stop control is inhibited. As described, in the case where the switch SW1 is stuck ON, it is impracticable to isolate the first power supply system 71 and the second power supply system 72 from each other, causing difficulties in maintaining the power supply voltage of the group of the electric devices 64 at the restart of the engine 12 by the starter generator 16.

Thus, in the case where the determination is made that the switch SW1 is stuck ON, the idling stop control is inhibited as the fail-safe operation, to avoid the restart of the engine 12 by the starter generator 16. It is to be noted that in the case where the determination is made that the switch SW1 is stuck ON while the engine 12 is stopped by the idling stop control, the idling stop control may be inhibited after the start of the engine 12.

For another example of the situation that the switch SW1 is controlled to the OFF state, the switch SW2 is controlled to the OFF state, and the starter generator 16 is controlled to the power generation suspended state, there may be given a situation that as illustrated in FIG. 8, the engine initial start control is executed. In other words, executing the fail-safe control, part 2, together with the execution of the engine initial start control makes it possible to detect easily that the switch SW1 is stuck ON, and thereafter, to inhibit the idling stop control properly.

As described, the idling stop control may be inhibited in the case where the applied voltage Visg to the starter generator 16 is greater than the threshold V1, with the power generation suspension signal transmitted to the starter generator 16, with the OFF signal transmitted to the switch SW1, and with the OFF signal transmitted to the switch SW2. Hence, it is possible to inhibit the idling stop control properly in the case with the possibility that the switch SW1 is stuck ON.

(Fail-Safe Control, Part 3)

Figure 14:
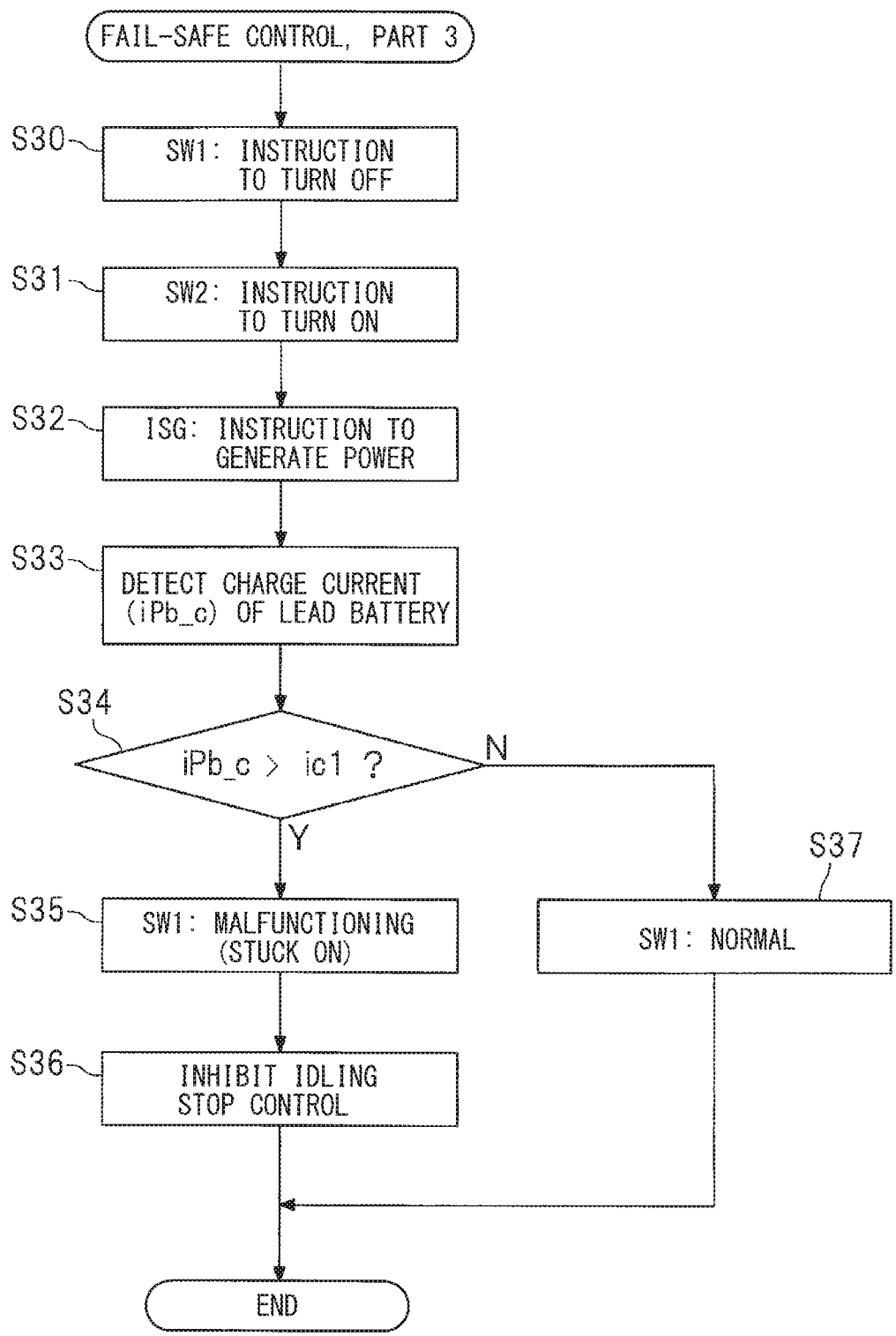
FIG. 14 is a flowchart of an example of an execution procedure in a fail-safe control, part 3.
Figure 15A:
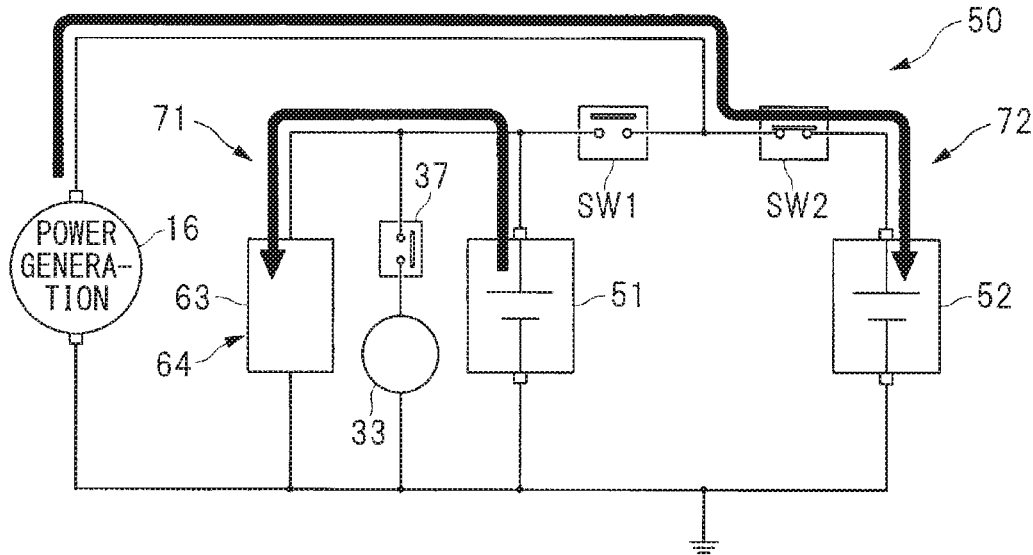
FIGS. 15A and 15B are diagrams of examples of situations as to how currents are supplied, in executing a switch malfunctioning determination processing in the fail-safe control, part 3.
Figure 15B:
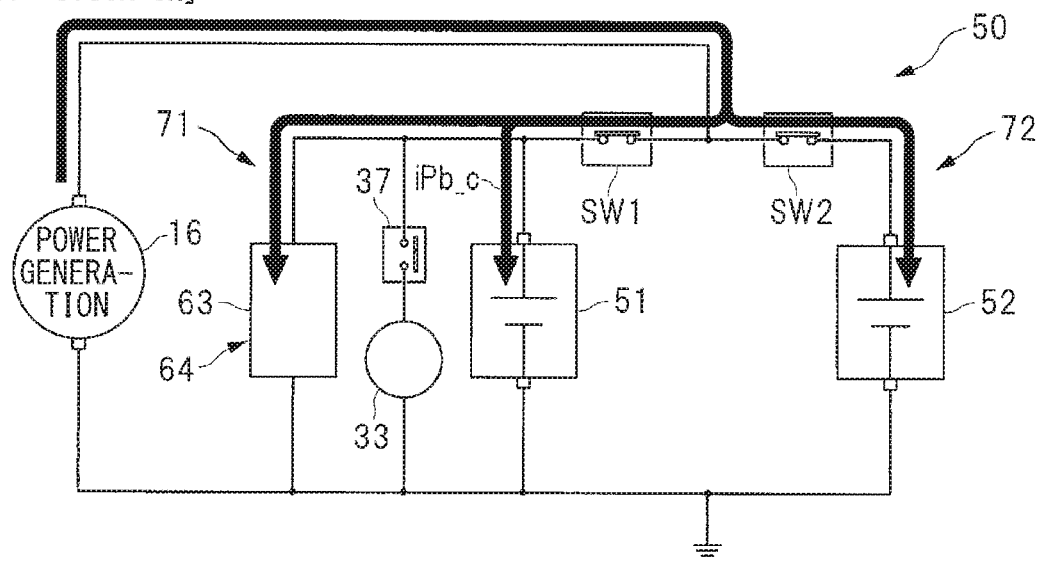

FIG. 14 is a flowchart of an example of an execution procedure in the fail-safe control, part 3. FIGS. 15A and 15B are diagrams of examples of situations as to how currents are supplied, in executing a switch malfunctioning determination processing in the fail-safe control, part 3. FIG. 15A illustrates the situation in the case where the switch SW1 is normal. FIG. 15B illustrates the situation in the case where the switch SW1 is stuck ON. It is to be noted that black arrows in FIGS. 15A and 15B indicate how the currents are supplied.

Referring to FIG. 14, in step S30, the OFF signal may be transmitted to the switch SW1. In step S31, the ON signal may be transmitted to the switch SW2. In step S32, the power generation signal may be transmitted to the starter generator 16. Thereafter, in step S33, a charge current iPb_c to be charged in the lead battery 51 may be detected. It is to be noted that the charge current iPb_c of the lead battery 51 may be detected by the battery sensor 65.

In one embodiment of the technology, the charge current iPb_c may serve as a "current of the first electrical energy accumulator".

Thereafter, in step S34, a determination may be made as to whether or not the charge current iPb_c of the lead battery 51 is greater than a predetermined threshold ic1. In step S34, in a case where a determination is made that the charge current iPb_c is greater than the threshold ic1 (Y in step S34), the flow may proceed to step S35. In step S35, a determination may be made that the switch SW1 is stuck ON. In the case where the determination is made that the switch SW1 is stuck ON, the flow may proceed to step S36. In step S36, the idling stop control accompanied by the restart of the engine 12 may be inhibited. Meanwhile, in step S34, in a case where a determination is made that the charge current iPb_c is equal to or smaller than the threshold ic1 (N in step S34), the flow may proceed to step S37. In step S37, a determination may be made that the switch SW1 is normal.

In one embodiment of the technology, the threshold ic1 may serve as a "third threshold".

As illustrated in FIG. 15A, in the case where the switch SW1 is normal, the switch SW1 is controlled to the OFF state. The switch SW2 is controlled to the ON state. The starter generator 16 is controlled to the power generation state. In this case, the lead battery 51 is isolated from the starter generator 16. Accordingly, the charge current iPb_c of the lead battery 51 is 0 (zero) A. It is to be noted that in the situation illustrated in FIG. 15A, the discharge current flows from the lead battery 51 in accordance with an operation state of the group of the electric devices 64.

In contrast, as illustrated in FIG. 15B, in the case where the switch SW1 is stuck ON, the switch SW1 is kept at the ON state. The switch SW2 is controlled to the ON state. The starter generator 16 is controlled to the power generation state. In this case, the lead battery 51 is coupled to the starter generator 16. Accordingly, the charge current iPb_c flows to the lead battery 51 from the starter generator 16 engaged in the power generation.

In other words, in the case where the switch SW1 is stuck ON, the charge current iPb_c of the lead battery 51 becomes larger than in the case where the switch SW1 is normal. Accordingly, comparing the charge current iPb_c with the threshold ic1 to determine their magnitude relation and grasping how the charge current iPb_c is increasing makes it possible to detect that the switch SW1 is stuck ON. It is to be noted that the threshold ic1 may be set on the basis of, for example but not limited to, experiments and simulation so as to grasp how the charge current iPb_c is increasing.

In the case where the determination is made that the switch SW1 is stuck ON because the charge current iPb_c is greater than the threshold ic1, the idling stop control is inhibited. As described, in the case where the switch SW1 is stuck ON, it is impracticable to isolate the first power supply system 71 and the second power supply system 72 from each other, causing difficulties in maintaining the power supply voltage of the group of the electric devices 64 at the restart of the engine 12 by the starter generator 16.

Thus, in the case where the determination is made that the switch SW1 is stuck ON, the idling stop control is inhibited as the fail-safe operation, to avoid the restart of the engine 12 by the starter generator 16. It is to be noted that in the case where the determination is made that the switch SW1 is stuck ON while the engine 12 is stopped by the idling stop control, the idling stop control may be inhibited after the start of the engine 12.

As described, the idling stop control may be inhibited in the case where the charge current iPb_c of the lead battery 51 is greater than the threshold ic1, with the power generation signal transmitted to the starter generator 16, with the OFF signal transmitted to the switch SW1, and with the ON signal transmitted to the switch SW2. Hence, it is possible to inhibit the idling stop control properly in the case with the possibility that the switch SW1 is stuck ON.

(Fail-Safe Control, Part 4)

Figure 16:
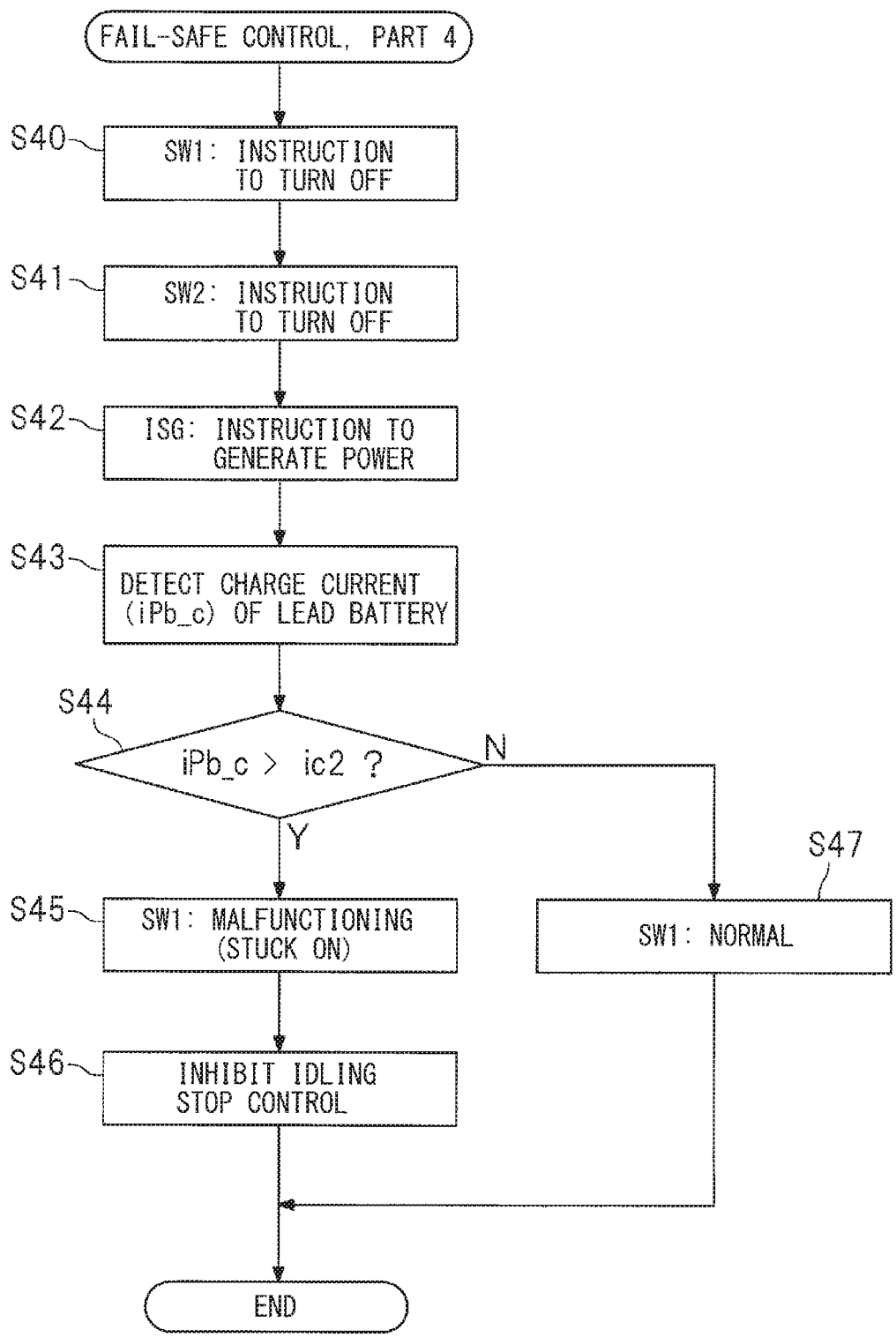
FIG. 16 is a flowchart of an example of an execution procedure in a fail-safe control, part 4.
Figure 17A:
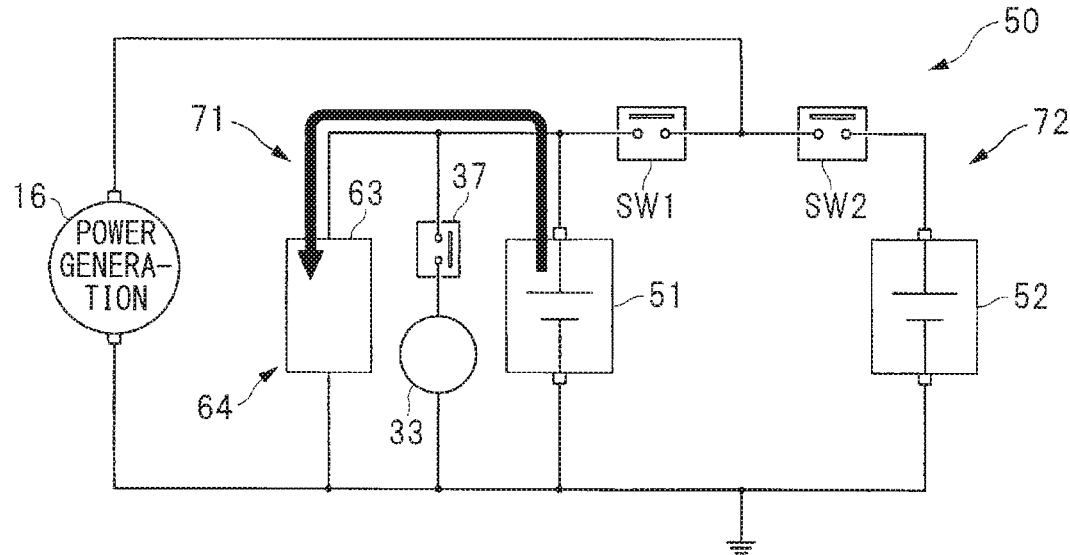
FIGS. 17A and 17B are diagrams of examples of situations as to how currents are supplied, in executing a switch malfunctioning determination processing in the fail-safe control, part 4.
Figure 17B:
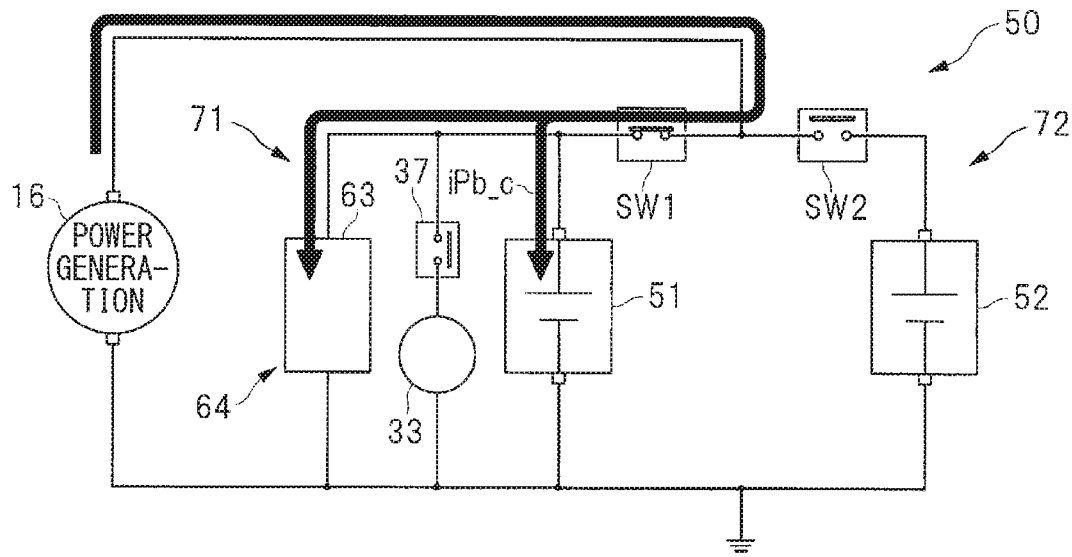

FIG. 16 is a flowchart of an example of an execution procedure in the fail-safe control, part 4. FIGS. 17A and 17B are diagrams of examples of situations as to how currents are supplied, in executing a switch malfunctioning determination processing in the fail-safe control, part 4. FIG. 17A illustrates the situation in the case where the switch SW1 is normal. FIG. 17B illustrates the situation in the case where the switch SW1 is stuck ON. It is to be noted that black arrows in FIGS. 17A and 17B indicate how the currents are supplied.

Referring to FIG. 16, in step S40, the OFF signal may be transmitted to the switch SW1. In step S41, the OFF signal may be transmitted to the switch SW2. In step S42, the power generation signal may be transmitted to the starter generator 16. Thereafter, in step S43, the charge current iPb_c to be charged in the lead battery 51 may be detected. It is to be noted that the charge current iPb_c of the lead battery 51 may be detected by the battery sensor 65.

In one embodiment of the technology, the charge current iPb_c may serve as a "current of the first electrical energy accumulator".

Thereafter, in step S44, a determination may be made as to whether or not the charge current iPb_c of the lead battery 51 is greater than a predetermined threshold ic2. In step S44, in a case where a determination is made that the charge current iPb_c is greater than the threshold ic2 (Y in step S44), the flow may proceed to step S45. In step S45, a determination may be made that the switch SW1 is stuck ON. In the case where the determination is made that the switch SW1 is stuck ON, the flow may proceed to step S46. In step S46, the idling stop control accompanied by the restart of the engine 12 may be inhibited. Meanwhile, in step S44, in a case where a determination is made that the charge current iPb_c is equal to or smaller than the threshold ic2 (N in step S44), the flow may proceed to step S47. In step S47, a determination may be made that the switch SW1 is normal.

In one embodiment of the technology, the threshold ic2 may serve as a "fourth threshold".

As illustrated in FIG. 17A, in the case where the switch SW1 is normal, the switch SW1 is controlled to the OFF state. The switch SW2 is controlled to the OFF state. The starter generator 16 is controlled to the power generation state. In this case, the lead battery 51 is isolated from the starter generator 16. Accordingly, the charge current iPb_c of the lead battery 51 is 0 (zero) A. It is to be noted that in the situation illustrated in FIG. 17A, the discharge current flows from the lead battery 51 in accordance with the operation state of the group of the electric devices 64.

In contrast, as illustrated in FIG. 17B, in the case where the switch SW1 is stuck ON, the switch SW1 is kept at the ON state. The switch SW2 is controlled to the OFF state. The starter generator 16 is controlled to the power generation state. In this case, the lead battery 51 is coupled to the starter generator 16. Accordingly, the charge current iPb_c flows to the lead battery 51 from the starter generator 16 engaged in the power generation.

In other words, in the case where the switch SW1 is stuck ON, the charge current iPb_c of the lead battery 51 becomes larger than in the case where the switch SW1 is normal. Accordingly, comparing the charge current iPb_c with the threshold ic2 to determine their magnitude relation and grasping how the charge current iPb_c is increasing makes it possible to detect that the switch SW1 is stuck ON. It is to be noted that the threshold ic2 may be set on the basis of, for example but not limited to, experiments and simulation so as to grasp how the charge current iPb_c is increasing.

In the case where the determination is made that the switch SW1 is stuck ON because the charge current iPb_c is greater than the threshold ic2, the idling stop control is inhibited. As described, in the case where the switch SW1 is stuck ON, it is impracticable to isolate the first power supply system 71 and the second power supply system 72 from each other, causing difficulties in maintaining the power supply voltage of the group of the electric devices 64 at the restart of the engine 12 by the starter generator 16.

Thus, in the case where the determination is made that the switch SW1 is stuck ON, the idling stop control is inhibited as the fail-safe operation, to avoid the restart of the engine 12 by the starter generator 16. It is to be noted that in the case where the determination is made that the switch SW1 is stuck ON while the engine 12 is stopped by the idling stop control, the idling stop control may be inhibited after the start of the engine 12.

As described, the idling stop control may be inhibited in the case where the charge current iPb_c of the lead battery 51 is greater than the threshold ic2, with the power generation signal transmitted to the starter generator 16, with the OFF signal transmitted to the switch SW1, and with the OFF signal transmitted to the switch SW2. Hence, it is possible to inhibit the idling stop control properly in the case with the possibility that the switch SW1 is stuck ON.

(Fail-Safe Control, Part 5)

Figure 18:
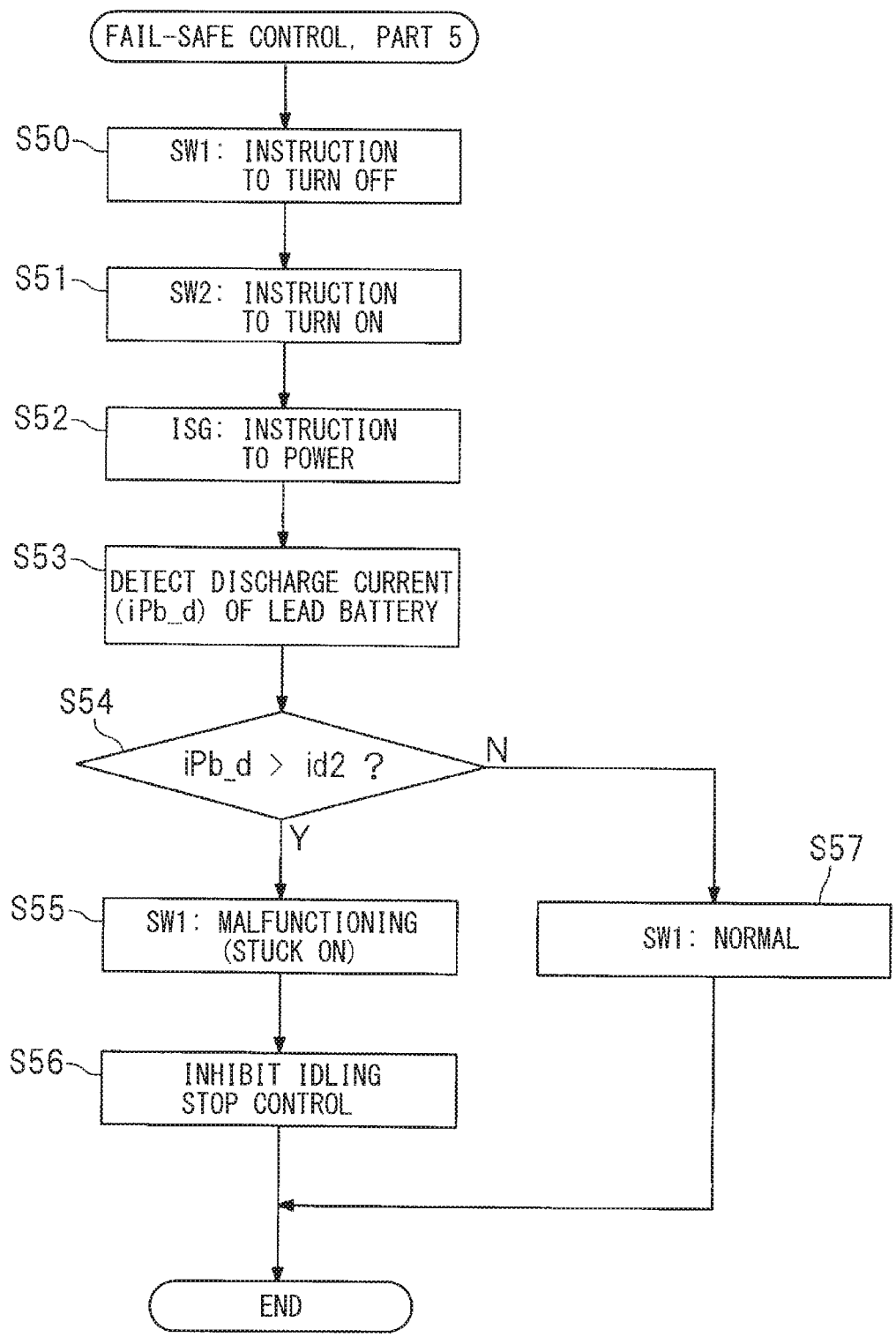
FIG. 18 is a flowchart of an example of an execution procedure in a fail-safe control, part 5.
Figure 19A:
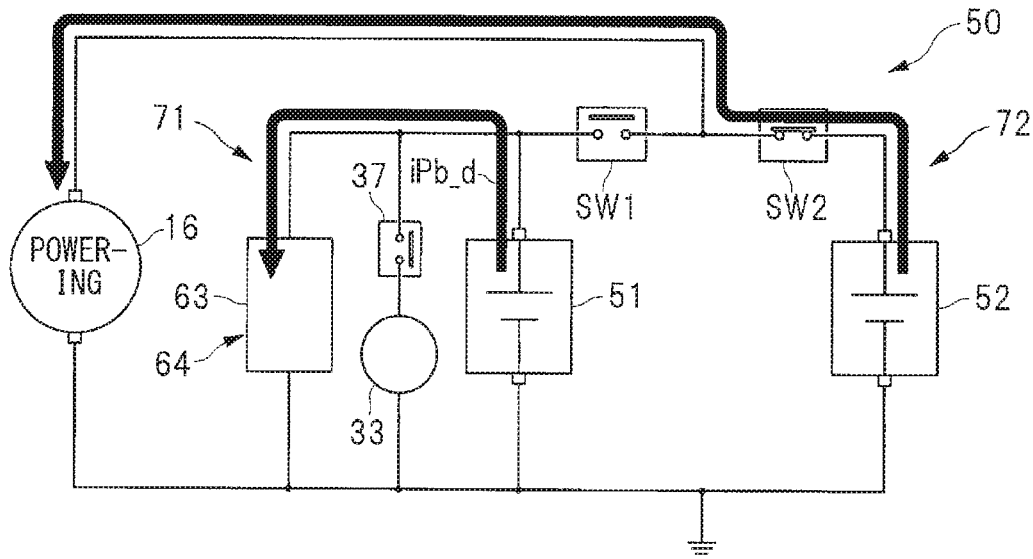
FIGS. 19A and 19B are diagrams of examples of situations as to how currents are supplied, in executing a switch malfunctioning determination processing in the fail-safe control, part 5.
Figure 19B:
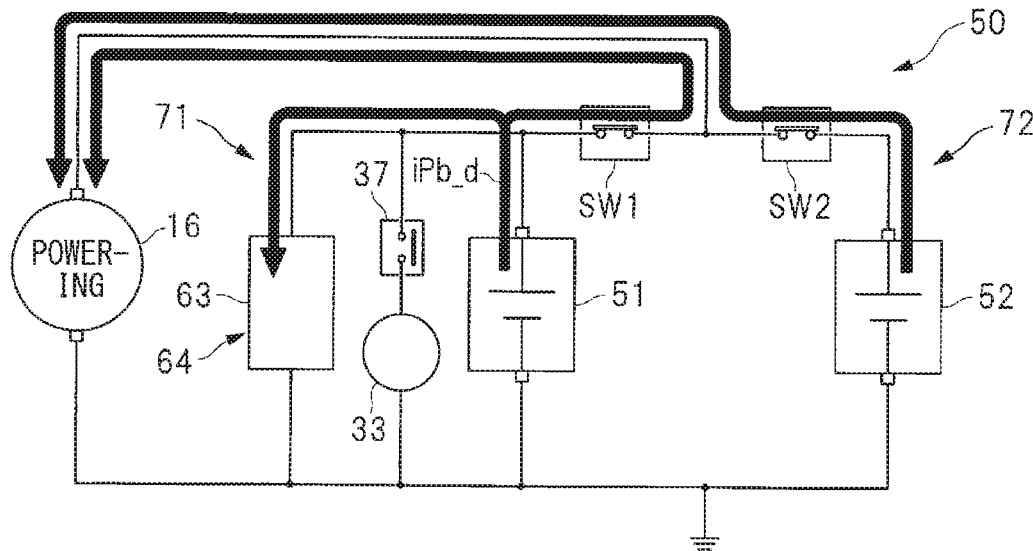

FIG. 18 is a flowchart of an example of an execution procedure in the fail-safe control, part 5. FIGS. 19A and 19B are diagrams of examples of situations as to how currents are supplied, in executing a switch malfunctioning determination processing in the fail-safe control, part 5. FIG. 19A illustrates the situation in the case where the switch SW1 is normal. FIG. 19B illustrates the situation in the case where the switch SW1 is stuck ON. It is to be noted that black arrows in FIGS. 19A and 19B indicate how the currents are supplied.

Referring to FIG. 18, in step S50, the OFF signal may be transmitted to the switch SW1. In step S51, the ON signal may be transmitted to the switch SW2. In step S52, the powering signal may be transmitted to the starter generator 16. Thereafter, in step S53, a discharge current iPb_d to be discharged from the lead battery 51 may be detected. It is to be noted that the discharge current iPb_d of the lead battery 51 may be detected by the battery sensor 65.

In one embodiment of the technology, the discharge current iPb_d may serve as a "current of the first electrical energy accumulator".

Thereafter, in step S54, a determination may be made as to whether or not the discharge current iPb_d of the lead battery 51 is greater than a predetermined threshold id2. In step S54, in a case where a determination is made that the discharge current iPb_d is greater than the threshold id2 (Y in step S54), the flow may proceed to step S55. In step S55, a determination may be made that the switch SW1 is stuck ON. In the case where the determination is made that the switch SW1 is stuck ON, the flow may proceed to step S56. In step S56, the idling stop control accompanied by the restart of the engine 12 may be inhibited. Meanwhile, in step S54, in a case where a determination is made that the discharge current iPb_d is equal to or smaller than the threshold id2 (N in step S54), the flow may proceed to step S57. In step S57, a determination may be made that the switch SW1 is normal.

In one embodiment of the technology, the threshold id2 may serve as a "fifth threshold".

As illustrated in FIG. 19A, in the case where the switch SW1 is normal, the switch SW1 is controlled to the OFF state. The switch SW2 is controlled to the ON state. The starter generator 16 is controlled to the powering state. In this case, the lead battery 51 is isolated from the starter generator 16, causing current supply from the lead battery 51 solely to the group of the electric devices 64. Accordingly, the discharge current iPb_d of the lead battery 51 has the current value that corresponds to the current consumption of the group of the electric devices 64.

In contrast, as illustrated in FIG. 19B, in the case where the switch SW1 is stuck ON, the switch SW1 is kept at the ON state. The switch SW2 is controlled to the ON state. The starter generator 16 is controlled to the powering state. In this case, the lead battery 51 is coupled to the starter generator 16, causing current supply from the lead battery 51 to the group of the electric devices 64 and the starter generator 16. Accordingly, the discharge current iPb_d of the lead battery 51 has a current value that corresponds to current consumption of the group of the electric devices 64 and the starter generator 16.

In other words, in the case where the switch SW1 is stuck ON, the discharge current iPb_d of the lead battery 51 becomes larger than in the case where the switch SW1 is normal. Accordingly, comparing the discharge current iPb_d with the threshold id2 to determine their magnitude relation and grasping how the discharge current iPb_d is increasing makes it possible to detect that the switch SW1 is stuck ON. It is to be noted that the threshold id2 may be set on the basis of, for example but not limited to, experiments and simulation so as to grasp how the discharge current iPb_d is increasing.

In the case where the determination is made that the switch SW1 is stuck ON because the discharge current iPb_d is greater than the threshold id2, the idling stop control is inhibited. As described, in the case where the switch SW1 is stuck ON, it is impracticable to isolate the first power supply system 71 and the second power supply system 72 from each other, causing difficulties in maintaining the power supply voltage of the group of the electric devices 64 at the restart of the engine 12 by the starter generator 16.

Thus, in the case where the determination is made that the switch SW1 is stuck ON, the idling stop control is inhibited as the fail-safe operation, to avoid the restart of the engine 12 by the starter generator 16. It is to be noted that in the case where the determination is made that the switch SW1 is stuck ON while the engine 12 is stopped by the idling stop control, the idling stop control may be inhibited after the start of the engine 12.

For another example of the situation that the switch SW1 is controlled to the OFF state, the switch SW2 is controlled to the ON state, and the starter generator 16 is controlled to the powering state, there may be given a situation that as illustrated in FIG. 6, the engine 12 is restarted in the idling stop control. In other words, executing the fail-safe control, part 5 together with the restart of the engine 12 in the idling stop control makes it possible to detect easily that the switch SW1 is stuck ON, and thereafter, to inhibit the idling stop control properly.

As described, the idling stop control may be inhibited in the case where the discharge current iPb_d of the lead battery 51 is greater than the threshold id2, with the powering signal transmitted to the starter generator 16, with the OFF signal transmitted to the switch SW1, and with the ON signal transmitted to the switch SW2. Hence, it is possible to inhibit the idling stop control properly in the case with the possibility that the switch SW1 is stuck ON.

(Fail-Safe Control, Part 6)

Figure 20:
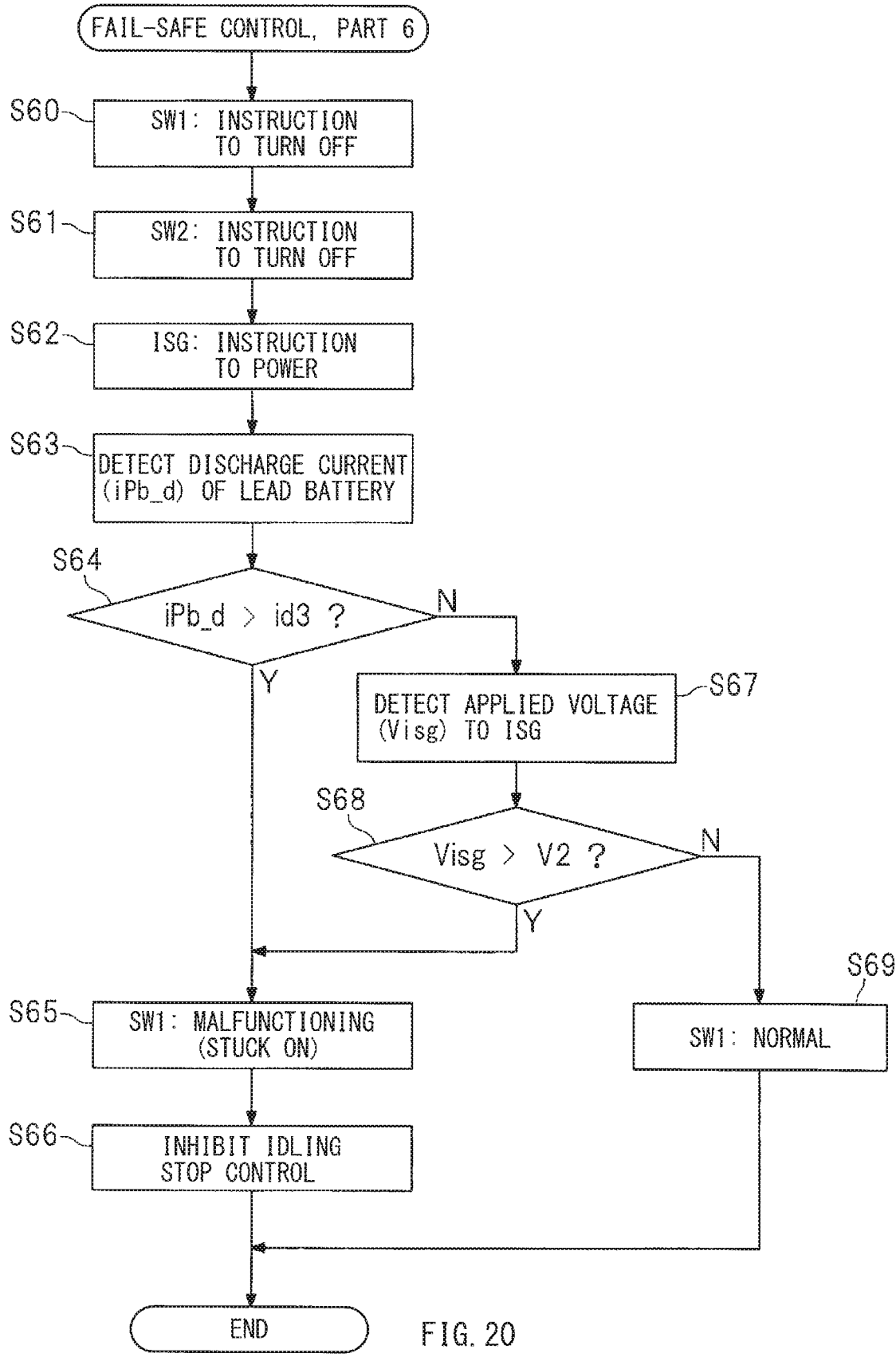
FIG. 20 is a flowchart of an example of an execution procedure in a fail-safe control, part 6.
Figure 21A:
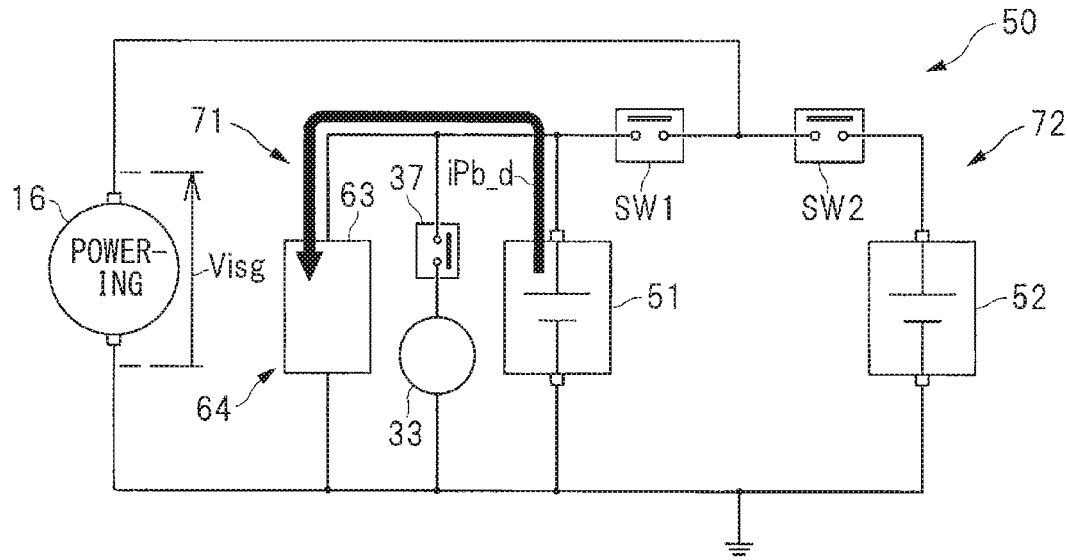
FIGS. 21A and 21B are diagrams of examples of situations as to how currents are supplied, in executing a switch malfunctioning determination processing in the fail-safe control, part 6 or a fail-safe control, part 7.
Figure 21B:
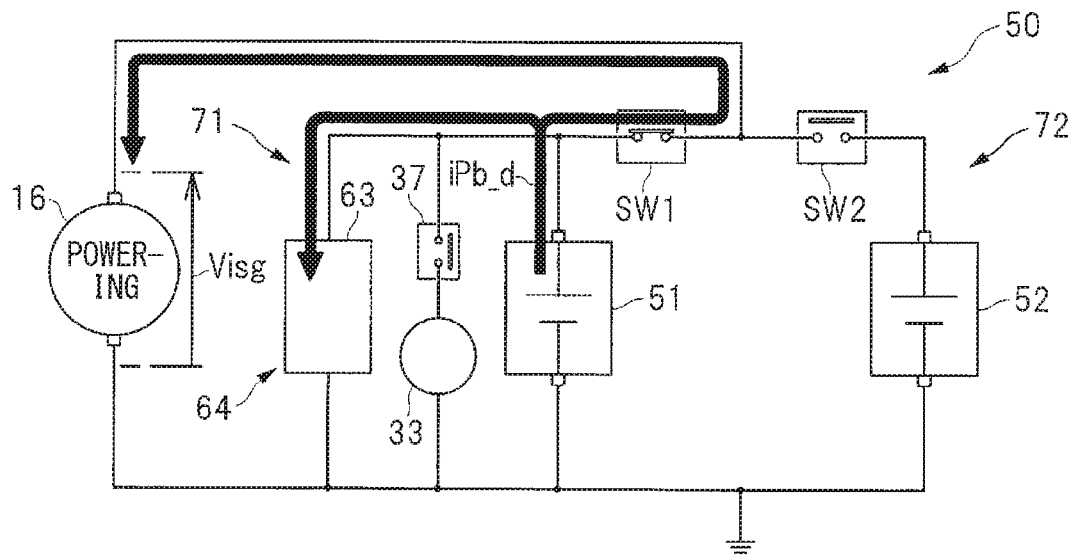

FIG. 20 is a flowchart of an example of an execution procedure in the fail-safe control, part 6. FIGS. 21A and 21B are diagrams of examples of situations as to how currents are supplied, in executing a switch malfunctioning determination processing in the fail-safe control, part 6 and the fail-safe control, part 7 described later. FIG. 21A illustrates the situation in the case where the switch SW1 is normal. FIG. 21B illustrates the situation in the case where the switch SW1 is stuck ON. It is to be noted that black arrows in FIGS. 21A and 21B indicate how the currents are supplied.

Referring to FIG. 20, in step S60, the OFF signal may be transmitted to the switch SW1. In step S61, the OFF signal may be transmitted to the switch SW2. In step S62, the powering signal may be transmitted to the starter generator 16. Thereafter, in step S63, the discharge current iPb_d to be discharged from the lead battery 51 may be detected. It is to be noted that the discharge current iPb_d of the lead battery 51 may be detected by the battery sensor 65.

In one embodiment of the technology, the discharge current iPb_d may serve as a "current of the first electrical energy accumulator".

Thereafter, in step S64, a determination may be made as to whether or not the discharge current iPb_d of the lead battery 51 is greater than a predetermined threshold id3. In step S64, in a case where a determination is made that the discharge current iPb_d is greater than the threshold id3 (Y in step S64), the flow may proceed to step S65. In step S65, a determination may be made that the switch SW1 is stuck ON. In the case where the determination is made that the switch SW1 is stuck ON, the flow may proceed to step S66. In step S66, the idling stop control accompanied by the restart of the engine 12 may be inhibited.

In one embodiment of the technology, the threshold id3 may serve as a "sixth threshold".

Meanwhile, in step S64, in a case where a determination is made that the discharge current iPb_d is equal to or smaller than the threshold id3 (N in step S64), the flow may proceed to step S67. In step S67, the terminal voltage Visg to be applied to the starter generator 16 may be detected. It is to be noted that the terminal voltage Visg to be applied to the starter generator 16, i.e., the applied voltage Visg to the starter generator 16, may be detected by the ISG controller 32.

In one embodiment of the technology, the terminal voltage Visg may serve as an "applied voltage to the generator motor" and a "voltage of the generator motor".

Thereafter, in step S68, a determination may be made as to whether or not the applied voltage Visg to the starter generator 16 is greater than a predetermined threshold V2. In step S68, in a case where a determination is made that the applied voltage Visg is greater than the threshold V2 (Y in step S68), the flow may proceed to step S65. In step S65, a determination may be made that the switch SW1 is stuck ON. In the case where the determination is made that the switch SW1 is stuck ON, the flow may proceed to step S66. In step S66, the idling stop control accompanied by the restart of the engine 12 may be inhibited.

In one embodiment of the technology, the threshold V2 may serve as a "seventh threshold".

Thus, in step S64, in the case where the determination is made that the discharge current iPb_d of the lead battery 51 is greater than the threshold id3 (Y in step S64), or in step S68, in the case where the determination is made that the applied voltage Visg to the starter generator 16 is greater than the threshold V2 (Y in step S68), the flow may proceed to step S65. In step S65, the determination may be made that the switch SW1 is stuck ON. Meanwhile, in step S64, in a case where a determination is made that the discharge current iPb_d of the lead battery 51 is equal to or smaller than the threshold id3, and in step S68, in a case where a determination is made that the applied voltage Visg to the starter generator 16 is equal to or smaller than the threshold V2 (N in step S64 and N in step S68), the flow may proceed to step S69. In step S69, a determination may be made that the switch SW1 is normal.

As illustrated in FIG. 21A, in the case where the switch SW1 is normal, the switch SW1 is controlled to the OFF state. The switch SW2 is controlled to the OFF state. The starter generator 16 is controlled to the powering state. In this case, the lead battery 51 is isolated from the starter generator 16, causing current supply from the lead battery 51 solely to the group of the electric devices 64. Accordingly, the discharge current iPb_d of the lead battery 51 has the current value that corresponds to the current consumption of the group of the electric devices 64.

In contrast, as illustrated in FIG. 21B, in the case where the switch SW1 is stuck ON, the switch SW1 is kept at the ON state. The switch SW2 is controlled to the OFF state. The starter generator 16 is controlled to the powering state. In this case, the lead battery 51 is coupled to the starter generator 16, causing current supply from the lead battery 51 to the group of the electric devices 64 and the starter generator 16. Accordingly, the discharge current iPb_d of the lead battery 51 has the current value that corresponds to the current consumption of the group of the electric devices 64 and the starter generator 16.

In other words, in the case where the switch SW1 is stuck ON, the discharge current iPb_d of the lead battery 51 becomes larger than in the case where the switch SW1 is normal. Accordingly, comparing the discharge current iPb_d with the threshold id3 to determine their magnitude relation and grasping how the discharge current iPb_d is increasing makes it possible to detect that the switch SW1 is stuck ON. It is to be noted that the threshold id3 may be set on the basis of, for example but not limited to, experiments and simulation so as to grasp how the discharge current iPb_d is increasing.

As illustrated in FIG. 21A, in the case where the switch SW1 is normal, the switch SW1 is controlled to the OFF state. The switch SW2 is controlled to the OFF state. The starter generator 16 is controlled to the powering state. In this case, both the lead battery 51 and the lithium ion battery 52 are isolated from the starter generator 16. Accordingly, the applied voltage Visg to the starter generator 16 is 0 (zero) V.

In contrast, as illustrated in FIG. 21B, in the case where the switch SW1 is stuck ON, the switch SW1 is kept at the ON state. The switch SW2 is controlled to the OFF state. The starter generator 16 is controlled to the powering state. In this case, the lead battery 51 is coupled to the starter generator 16. Accordingly, the applied voltage Visg to the starter generator 16 has the voltage value that corresponds to the terminal voltage of the lead battery 51.

In other words, in the case where the switch SW1 is stuck ON, the applied voltage Visg to the starter generator 16 becomes larger than in the case where the switch SW1 is normal. Accordingly, comparing the applied voltage Visg with the threshold V2 to determine their magnitude relation and grasping how the applied voltage Visg is increasing makes it possible to detect that the switch SW1 is stuck ON. It is to be noted that the threshold V2 may be set on the basis of, for example but not limited to, experiments and simulation so as to grasp how the applied voltage Visg is increasing.

In the case where the determination is made that the switch SW1 is stuck ON because the discharge current iPb_d is greater than the threshold id3, or because the applied voltage Visg is greater than the threshold V2, the idling stop control is inhibited. As described, in the case where the switch SW1 is stuck ON, it is impracticable to isolate the first power supply system 71 and the second power supply system 72 from each other, causing difficulties in maintaining the power supply voltage of the group of the electric devices 64 at the restart of the engine 12 by the starter generator 16.

Thus, in the case where the determination is made that the switch SW1 is stuck ON, the idling stop control is inhibited as the fail-safe operation, to avoid the restart of the engine 12 by the starter generator 16. It is to be noted that in the case where the determination is made that the switch SW1 is stuck ON while the engine 12 is stopped by the idling stop control, the idling stop control may be inhibited after the start of the engine 12.

As described, the idling stop control may be inhibited in the case where the discharge current iPb_d of the lead battery 51 is greater than the threshold id3, with the powering signal transmitted to the starter generator 16, with the OFF signal transmitted to the switch SW1, and with the OFF signal transmitted to the switch SW2. Hence, it is possible to inhibit the idling stop control properly in the case with the possibility that the switch SW1 is stuck ON.

Moreover, the idling stop control may be inhibited in the case where the applied voltage Visg to the starter generator 16 is greater than the threshold V2, with the powering signal transmitted to the starter generator 16, with the OFF signal transmitted to the switch SW1, and with the OFF signal transmitted to the switch SW2. Hence, it is possible to inhibit the idling stop control properly in the case with the possibility that the switch SW1 is stuck ON.

(Fail-Safe Control, Part 7)

In the fail-safe control, part 6, illustrated in FIG. 20, the idling stop control is inhibited in the case where the discharge current iPb_d of the lead battery 51 is greater than the threshold id3, or in the case where the applied voltage Visg to the starter generator 16 is greater than the threshold V2. However, this is non-limiting. In what follows, described is the fail-safe control, part 7. In the fail-safe control, part 7, the idling stop control may be inhibited in the case where the discharge current iPb_d of the lead battery 51 is greater than the threshold id3, and the applied voltage Visg to the starter generator 16 is greater than the threshold V2.

Figure 22:
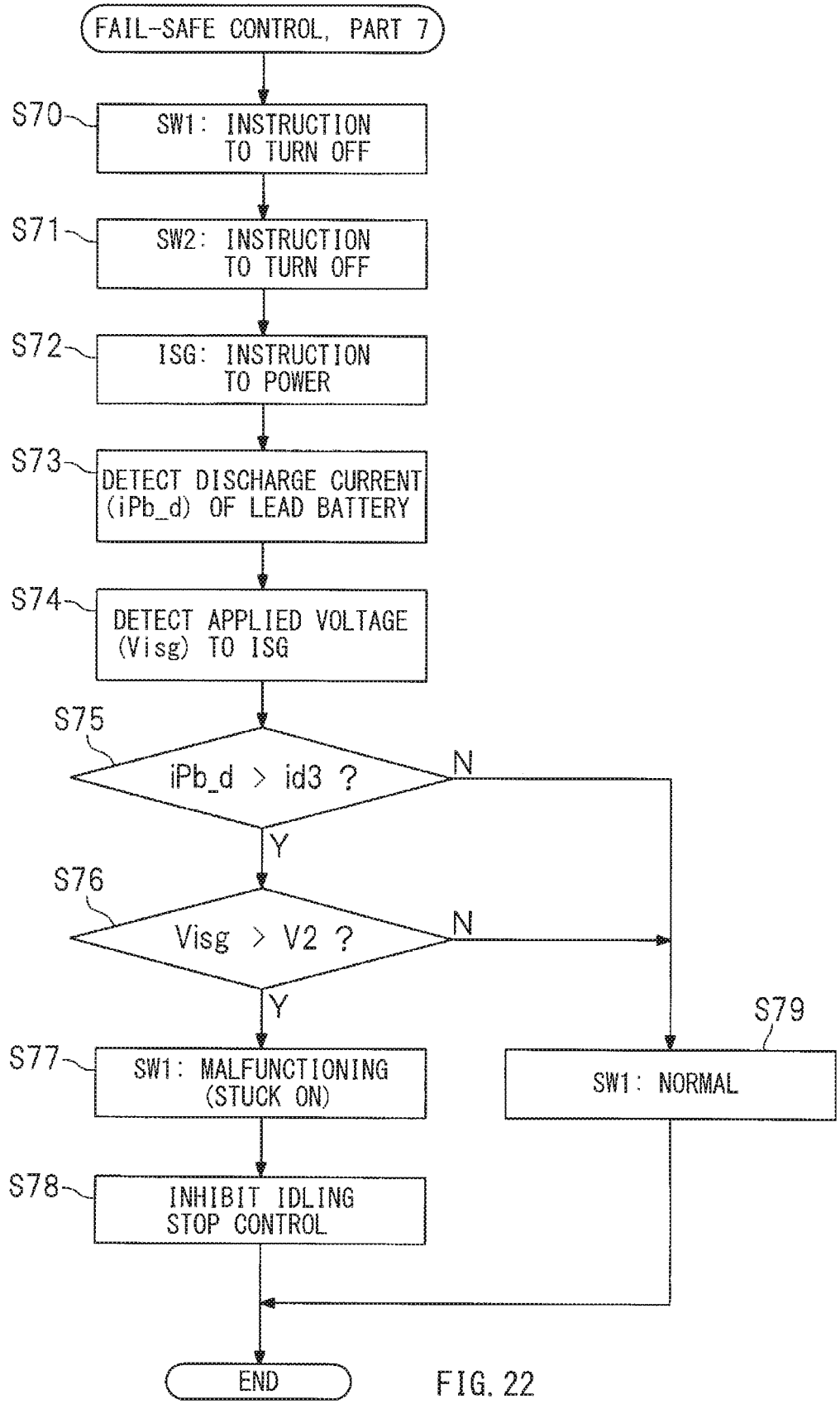
FIG. 22 is a flowchart of an example of an execution procedure in the fail-safe control, part 7.

FIG. 22 is a flowchart of an example of an execution procedure in the fail-safe control, part 7. Referring to FIG. 22, in step S70, the OFF signal may be transmitted to the switch SW1. In step S71, the OFF signal may be transmitted to the switch SW2. In step S72, the powering signal may be transmitted to the starter generator 16.

Thereafter, in step S73, the discharge current iPb_d to be discharged from the lead battery 51 may be detected. In step S74, the terminal voltage Visg to be applied to the starter generator 16 may be detected. It is to be noted that the discharge current iPb_d of the lead battery 51 may be detected by the battery sensor 65. It is to be noted that the terminal voltage Visg to be applied to the starter generator 16, i.e., the applied voltage Visg to the starter generator 16, may be detected by the ISG controller 32.

In one embodiment of the technology, the discharge current iPb_d may serve as a "current of the first electrical energy accumulator". In one embodiment of the technology, the terminal voltage Visg may serve as an "applied voltage to the generator motor" and a "voltage of the generator motor".

Thereafter, in step S75, a determination may be made as to whether or not the discharge current iPb_d of the lead battery 51 is greater than a predetermined threshold id3. In step S75, in a case where a determination is made that the discharge current iPb_d is greater than the threshold id3 (Y in step S75), the flow may proceed to step S76. In step S76, a determination may be made as to whether or not the applied voltage Visg to the starter generator 16 is greater than the predetermined threshold V2. In step S76, in a case where a determination is made that the applied voltage Visg is greater than the threshold V2 (Y in step S76), the flow may proceed to step S77. In step S77, a determination may be made that the switch SW1 is stuck ON. In the case where the determination is made that the switch SW1 is stuck ON, the flow may proceed to step S78, in which the idling stop control may be inhibited.

In this way, in the case where in step S75, the determination is made that the discharge current iPb_d is greater than the threshold id3, and in step S76, the determination is made that the applied voltage Visg is greater than the threshold V2 (Y in step S75 and Y in step S76), the flow may proceed to step S77. In step S77, a determination may be made that the switch SW1 is stuck ON. Meanwhile, in step S75, in a case where a determination is made that the discharge current iPb_d is equal to or smaller than the threshold id3 (N in step S75), or in step S76, in a case where a determination is made that the applied voltage Visg is equal to or smaller than the threshold V2 (N in step S76), the flow may proceed to step S79. In step S79, a determination may be made that the switch SW1 is normal.

As illustrated in FIG. 21A mentioned above, in the case where the switch SW1 is normal, the switch SW1 is controlled to the OFF state. The switch SW2 is controlled to the OFF state. The starter generator 16 is controlled to the powering state. In this case, current supply is provided from the lead battery 51 solely to the group of the electric devices 64. Accordingly, the discharge current iPb_d of the lead battery 51 has the current value that corresponds to the current consumption of the group of the electric devices 64. Furthermore, both the lead battery 51 and the lithium ion battery 52 are isolated from the starter generator 16. Accordingly, the applied voltage Visg to the starter generator 16 is 0 (zero) V.

In contrast, as illustrated in FIG. 21B, in the case where the switch SW1 is stuck ON, the switch SW1 is kept at the ON state. The switch SW2 is controlled to the OFF state. The starter generator 16 is controlled to the powering state. In this case, current supply is provided from the lead battery 51 to the group of the electric devices 64 and the starter generator 16. Accordingly, the discharge current iPb_d of the lead battery 51 has the current value that corresponds to the current consumption of the group of the electric devices 64 and the starter generator 16. Furthermore, the lead battery 51 is coupled to the starter generator 16. Accordingly, the applied voltage Visg to the starter generator 16 has the voltage value that corresponds to the terminal voltage of the lead battery 51.

In other words, in the case where the switch SW1 is stuck ON, the discharge current iPb_d of the lead battery 51 becomes larger than in the case where the switch SW1 is normal, and the applied voltage Visg to the starter generator 16 becomes larger than in the case where the switch SW1 is normal. Accordingly, comparing the discharge current iPb_d with the threshold id3 to determine their magnitude relation and grasping how the discharge current iPb_d is increasing, and comparing the applied voltage Visg with the threshold V2 to determine their magnitude relation and grasping how the applied voltage Visg is increasing make it possible to detect that the switch SW1 is stuck ON. It is to be noted that the threshold id3 may be set on the basis of, for example but not limited to, experiments and simulation so as to grasp how the discharge current iPb_d is increasing. The threshold V2 may be set on the basis of, for example but not limited to, experiments and simulation so as to grasp how the applied voltage Visg is increasing.

In the case where the determination is made that the switch SW1 is stuck ON because the discharge current iPb_d is greater than the threshold id3, and the applied voltage Visg is greater than the threshold V2, the idling stop control is inhibited. As described, in the case where the switch SW1 is stuck ON, it is impracticable to isolate the first power supply system 71 and the second power supply system 72 from each other, causing difficulties in maintaining the power supply voltage of the group of the electric devices 64 at the restart of the engine 12 by the starter generator 16. Thus, in the case where the determination is made that the switch SW1 is stuck ON, the idling stop control is inhibited as the fail-safe operation, to avoid the restart of the engine 12 by the starter generator 16. It is to be noted that in the case where the determination is made that the switch SW1 is stuck ON while the engine 12 is stopped by the idling stop control, the idling stop control may be inhibited after the start of the engine 12.

As described, the idling stop control may be inhibited in the case where the discharge current iPb_d of the lead battery 51 is greater than the threshold id3, and the applied voltage Visg to the starter generator 16 is greater than the predetermined threshold V2, with the powering signal transmitted to the starter generator 16, with the OFF signal transmitted to the switch SW1, and with the OFF signal transmitted to the switch SW2. Hence, it is possible to inhibit the idling stop control properly in the case with the possibility that the switch SW1 is stuck ON.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. In the forgoing example embodiments, the lead battery 51 may serve as the "first electrical energy accumulator", but this is non-limiting. Other kinds of batteries or capacitors may be adopted as the "first electrical energy accumulator". Moreover, in the forgoing example embodiments, the lithium ion battery 52 may serve as the "second electrical energy accumulator", but this is non-limiting. Other kinds of batteries or capacitors may be adopted as the "second electrical energy accumulator". Furthermore, in the forgoing example embodiments illustrated in FIGS. 1 and 2, the switch SW2 is provided on the positive electrode line 54 of the lithium ion battery 52, but this is non-limiting. For example, as denoted by an alternate long and short dashed line in FIG. 2, the switch SW2 may be provided on the negative electrode line 59 of the lithium ion battery 52. In addition, in the forgoing example embodiments, the main controller 80 includes the engine control unit 81, the ISG control unit 82, the first switch control unit 83, the second switch control unit 84, the starter control unit 86, the lock up clutch control unit 87, and the idling stop determination unit 85, but this is non-limiting. The engine control unit 81, the ISG control unit 82, the first switch control unit 83, the second switch control unit 84, the starter control unit 86, the lock up clutch control unit 87, or the idling stop determination unit 85, or any combination thereof may be provided in another controller, or alternatively, the engine control unit 81, the ISG control unit 82, the first switch control unit 83, the second switch control unit 84, the starter control unit 86, the lock up clutch control unit 87, and the idling stop determination unit 85 may be distributed over a plurality of controllers.

As to the fail-safe control, parts 1 to 7 illustrated in FIGS. 10 to 22, any one of parts 1 to 7 of the fail-safe control may be executed alone. Alternatively, two or more of parts 1 to 6 of the fail-safe control may be executed in combination. In another alternative, two or more of parts 1, 2, 3, 4, 5, and 7 of the fail-safe control may be executed in combination. For example, parts 1 and 2 of the fail-safe control may be executed in combination. In this case, the idling stop control may be inhibited in a case where a determination is made, on the basis of the fail-safe control, part 1, that the discharge current iLi_d of the lithium ion battery 52 is greater than the threshold id1, and a determination is made, on the basis of the fail-safe control, part 2, that the applied voltage Visg to the starter generator 16 is greater than the threshold V1.

As described, the idling stop determination unit 85 determines whether or not to inhibit the idling stop control on the basis of the current of the lead battery 51, the current of the lithium ion battery 52, or the voltage of the starter generator 16, or any combination thereof, while recognizing the control signal to be transmitted to the starter generator 16, the control signal to be transmitted to the switch SW1, and the control signal to be transmitted to the switch SW2.

The main controller 80, the engine control unit 81, the ISG control unit 82, the first switch control unit 83, the second switch control unit 84, the idling stop determination unit 85, the starter control unit 86, and the lock up clutch control unit 87 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 80, the engine control unit 81, the ISG control unit 82, the first switch control unit 83, the second switch control unit 84, the idling stop determination unit 85, the starter control unit 86, and the lock up clutch control unit 87. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 80, the engine control unit 81, the ISG control unit 82, the first switch control unit 83, the second switch control unit 84, the idling stop determination unit 85, the starter control unit 86, and the lock up clutch control unit 87 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle power supply apparatus to be mounted on a vehicle that includes an engine, the vehicle power supply apparatus comprising:
   a first power supply system including a first electrical energy accumulator and an electric load coupled to the first electrical energy accumulator;
   a second power supply system including a generator motor and a second electrical energy accumulator, the generator motor being coupled to the engine, and the second electrical energy accumulator being able to be coupled to the generator motor;
   a first switch configured to be controlled to a first turn-on state and a first turn-off state, the first turn-on state including coupling the first power supply system and the second power supply system to each other, and the first turn-off state including isolating the first power supply system and the second power supply system from each other;

a second switch configured to be controlled to a second turn-on state and a second turn-off state, the second turn-on state including coupling the generator motor and the second electrical energy accumulator to each other, and the second turn-off state including isolating the generator motor and the second electrical energy accumulator from each other; and a controller configured to:
transmit a first control signal to the first switch and to control the first switch to the first turn-on state and the first turn-off state;
transmit a second control signal to the second switch and to control the second switch to the second turn-on state and the second turn-off state;
transmit a third control signal to the generator motor and to control an operation state of the generator motor;
execute an idling stop control, the idling stop control including stopping the engine on a basis of a stop condition and restarting the engine on a basis of a start condition with use of the generator motor; and
determine whether or not to inhibit the idling stop control on a basis of a current of the first electrical energy accumulator, a current of the second electrical energy accumulator, or a voltage of the generator motor, or any combination thereof, while recognizing the third control signal to be transmitted to the generator motor, the first control signal to be transmitted to the first switch, and the second control signal to be transmitted to the second switch, wherein the first control signal to be transmitted to the first switch includes a first turn-on signal and a first turn-off signal, the first turn-on signal controlling the first switch to the first turn-on state, and the first turn-off signal controlling the first switch to the first turn-off state, the second control signal to be transmitted to the second switch includes a second turn-on signal and a second turn-off signal, the second turn-on signal controlling the second switch to the second turn-on state, and the second turn-off signal controlling the second switch to the second turn-off state, the operation state of the generator motor includes a powering state, a power generation state, and a power generation suspended state, and the third control signal to be transmitted to the generator motor includes a powering signal, a power generation signal, and a power generation suspension signal, the powering signal controlling the generator motor to the powering state, the power generation signal controlling the generator motor to the power generation state, and the power generation suspension signal controlling the generator motor to the power generation suspended state.

2. The vehicle power supply apparatus according to claim 1, wherein
the controller inhibits the idling stop control on a condition that a discharge current from the second electrical energy accumulator is greater than a first threshold,
with the power generation suspension signal transmitted to the generator motor, with the first turn-off signal transmitted to the first switch, and with the second turn-on signal transmitted to the second switch.

3. The vehicle power supply apparatus according to claim 1, wherein
the controller inhibits the idling stop control on a condition that an applied voltage to the generator motor is greater than a second threshold,
with the power generation suspension signal transmitted to the generator motor, with the first turn-off signal transmitted to the first switch, and with the second turn-off signal transmitted to the second switch.

4. The vehicle power supply apparatus according to claim 1, wherein
the controller inhibits the idling stop control on a condition that a charge current of the first electrical energy accumulator is greater than a third threshold,
with the power generation signal transmitted to the generator motor, with the first turn-off signal transmitted to the first switch, and with the second turn-on signal transmitted to the second switch.

5. The vehicle power supply apparatus according to claim 1, wherein
the controller inhibits the idling stop control on a condition that a charge current of the first electrical energy accumulator is greater than a fourth threshold,
with the power generation signal transmitted to the generator motor, with the first turn-off signal transmitted to the first switch, and with the second turn-off signal transmitted to the second switch.

6. The vehicle power supply apparatus according to claim 1, wherein
the controller inhibits the idling stop control on a condition that a discharge current from the first electrical energy accumulator is greater than a fifth threshold,
with the powering signal transmitted to the generator motor, with the first turn-off signal transmitted to the first switch, and with the second turn-on signal transmitted to the second switch.

7. The vehicle power supply apparatus according to claim 1, wherein
the controller inhibits the idling stop control on a condition that a discharge current from the first electrical energy accumulator is greater than a sixth threshold,
with the powering signal transmitted to the generator motor, with the first turn-off signal transmitted to the first switch, and with the second turn-off signal transmitted to the second switch.

8. The vehicle power supply apparatus according to claim 7, wherein
the controller inhibits the idling stop control on a condition that an applied voltage to the generator motor is greater than a seventh threshold,
with the powering signal transmitted to the generator motor, with the first turn-off signal transmitted to the first switch, and with the second turn-off signal transmitted to the second switch.

9. The vehicle power supply apparatus according to claim 1, wherein
the controller inhibits the idling stop control on a condition that an applied voltage to the generator motor is greater than a seventh threshold,
with the powering signal transmitted to the generator motor, with the first turn-off signal transmitted to the first switch, and with the second turn-off signal transmitted to the second switch.

10. A vehicle power supply apparatus to be mounted on a vehicle that includes an engine, the vehicle power supply apparatus comprising:
a first power supply system including a first electrical energy accumulator and an electric load coupled to the first electrical energy accumulator;
a second power supply system including a generator motor and a second electrical energy accumulator, the generator motor being coupled to the engine, and the second electrical energy accumulator being able to be coupled to the generator motor;

a first switch configured to be controlled to a first turn-on state and a first turn-off state, the first turn-on state including coupling the first power supply system and the second power supply system to each other, and the first turn-off state including isolating the first power supply system and the second power supply system from each other;

a second switch configured to be controlled to a second turn-on state and a second turn-off state, the second turn-on state including coupling the generator motor and the second electrical energy accumulator to each other, and the second turn-off state including isolating the generator motor and the second electrical energy accumulator from each other; and circuitry configured to transmit a first control signal to the first switch and to control the first switch to the first turn-on state and the first turn-off state, transmit a second control signal to the second switch and to control the second switch to the second turn-on state and the second turn-off state, transmit a third control signal to the generator motor and to control an operation state of the generator motor, execute an idling stop control, the idling stop control including stopping the engine on a basis of a stop condition and restarting the engine on a basis of a start condition with use of the generator motor, and determine whether or not to inhibit the idling stop control on a basis of a current of the first electrical energy accumulator, a current of the second electrical energy accumulator, or a voltage of the generator motor, or any combination thereof, while recognizing the third control signal to be transmitted to the generator motor, the first control signal to be transmitted to the first switch, and the second control signal to be transmitted to the second switch, wherein the first control signal to be transmitted to the first switch includes a first turn-on signal and a first turn-off signal, the first turn-on signal controlling the first switch to the first turn-on state, and the first turn-off signal controlling the first switch to the first turn-off state, the second control signal to be transmitted to the second switch includes a second turn-on signal and a second turn-off signal, the second turn-on signal controlling the second switch to the second turn-on state, and the second turn-off signal controlling the second switch to the second turn-off state, the operation state of the generator motor includes a powering state, a power generation state, and a power generation suspended state, and the third control signal to be transmitted to the generator motor includes a powering signal, a power generation signal, and a power generation suspension signal, the powering signal controlling the generator motor to the powering state, the power generation signal controlling the generator motor to the power generation state, and the power generation suspension signal controlling the generator motor to the power generation suspended state.

* * * * *